(12) United States Patent
Kurneta et al.

(10) Patent No.: US 12,540,031 B2
(45) Date of Patent: Feb. 3, 2026

(54) CONTINUOUS MOTION SYSTEMS AND METHODS FOR AUTOMATIC OBJECT LOADING AND TRANSPORTATION

(71) Applicant: Optum, Inc., Minnetonka, MN (US)

(72) Inventors: Aaron M. Kurneta, Chandler, AZ (US); Warren Thomas Roberts, Phoenix, AZ (US); Holmberg Lopez, Bonsall, CA (US); Michael L. Mahar, Tempe, AZ (US)

(73) Assignee: Optum, Inc., Minnetonka, MN (US)

( * ) Notice: Subject to any disclaimer, the term of this patent is extended or adjusted under 35 U.S.C. 154(b) by 153 days.

(21) Appl. No.: 18/523,706

(22) Filed: Nov. 29, 2023

(65) Prior Publication Data
US 2025/0171230 A1 May 29, 2025

(51) Int. Cl.
*B65G 47/48* (2006.01)
*B65G 1/04* (2006.01)

(52) U.S. Cl.
CPC .................. *B65G 1/0485* (2013.01)

(58) Field of Classification Search
CPC ... B65G 1/0485; B65G 47/5104; B65G 47/48
USPC ...................................... 198/347.1
See application file for complete search history.

(56) References Cited

U.S. PATENT DOCUMENTS 4,832,173 A * 5/1989 Hattori .................. B07C 5/3408
198/410
6,311,825 B1 * 11/2001 Schmitt .............. B65G 47/1457
198/470.1
8,028,815 B2 * 10/2011 Hahn ................. B65G 47/5113
198/347.1

(Continued)

FOREIGN PATENT DOCUMENTS

DE      102019110883 A1 * 10/2020 ............. B65G 65/00
WO      WO-2004099046 A1 * 11/2004 ......... B65G 47/5104

(Continued)

OTHER PUBLICATIONS

US 2017/0043953 A1, Battles et al., Feb. 16, 2017.*

(Continued)

*Primary Examiner* — Douglas A Hess
(74) *Attorney, Agent, or Firm* — Alston & Bird LLP

(57) ABSTRACT

Various embodiments of the present disclosure provide techniques and systems for improving efficiency of fulfillment systems. One technique may include moving a plurality of container carriers to one or more carrier recirculation systems. The technique may include moving a plurality of item containers to a container recirculation system, positioned at least partially parallel to a carrier recirculation system of the one or more carrier recirculation systems. The technique may include moving, using a container partitioning assembly of the container recirculation system, an item container of the plurality of item containers into an induction system. The technique may include moving, using a carrier partitioning assembly of the one or more carrier recirculation systems, a container carrier of the plurality of container carriers to a loading position relative to the induction system. The technique may include loading the item container into an interior portion of the container carrier.

20 Claims, 6 Drawing Sheets

(56) References Cited

U.S. PATENT DOCUMENTS

| | | | |
|---|---|---|---|
| 8,616,822 B2* | 12/2013 | Winkler | B65G 1/0435 |
| | | | 211/151 |
| 8,915,422 B1 | 12/2014 | Harty et al. | |
| 9,459,273 B2 | 10/2016 | Moix et al. | |
| 10,118,773 B2 | 11/2018 | Mahar | |
| 10,964,420 B2 | 3/2021 | Joplin | |
| 11,332,325 B2* | 5/2022 | Kammerl | B65G 47/51 |
| 11,666,944 B1* | 6/2023 | De La Rosa | B07C 5/36 |
| | | | 209/549 |
| 11,945,661 B2* | 4/2024 | Bonnain | B65G 47/842 |
| 2007/0254277 A1 | 11/2007 | Scrabeck et al. | |
| 2010/0089803 A1 | 4/2010 | Lavi et al. | |
| 2018/0082757 A1 | 3/2018 | Chambers et al. | |
| 2019/0071257 A1 | 3/2019 | Bauer et al. | |

FOREIGN PATENT DOCUMENTS

| | | | | |
|---|---|---|---|---|
| WO | 2023/111891 A1 | 6/2023 | | |
| WO | WO-2024004890 A1 * | 1/2024 | ............... | B23G 7/02 |

OTHER PUBLICATIONS

US 2021/0371205 A1, Mutarelli et al., Dec. 2, 2021.*
US 2023/0002161 A1, Bauman et al., Jan. 5, 2023.*
US 2025/0164968 A1, Roberts et al., May 22, 2025.*
Applied Automated Solutions, "Medical Lab Automation", Published Online at https://appliedautomatedsolutions.com/medical-lab-automation/, First Retrieved from the Internet on Aug. 22, 2023, 4 pages.
Precision Automation Company, Inc, "RFID Labeling, Inspection, & Verification", Precision Automation, (2024), Retrieved on the Internet at https://precisionautomationinc.com/case-study/rfid-labeling-inspection-verification/.

* cited by examiner

CONTINUOUS MOTION SYSTEMS AND METHODS FOR AUTOMATIC OBJECT LOADING AND TRANSPORTATION

BACKGROUND

Various embodiments of the present disclosure address technical challenges related to high-volume logistics systems, such as those used for the fulfillment of pharmaceutical orders. Traditionally, high-volume logistics systems may leverage various conveyer assemblies to transport objects, such as pill vials in a pharmaceutical system, between different locations within a fulfillment system. In pharmaceutical systems or other systems that transport small items, such as vials, the movement of the items may be facilitated by placing the items into larger containers to improve the stability of the items as they are moved by a conveyer assembly. As one example, in a pharmaceutical system, a vial may be placed within a larger object, such as circular puck, to improve the vial's stability (and/or allow for tracking, among other advantages) as it is moved, filled, and/or otherwise transferred from an empty pill vial to a filled pill vial ready for dispatch to an end user.

Traditional fulfillment systems either manually or electronically (e.g., through electronically controlled gates, and/or the like) load items, such as vials, into their larger counterparts, such as pucks. For example, some traditional fulfillment systems may include electronically controlled gates to selectively push or direct objects into a loading system. However, such gates increase costs, complexity, and maintenance requirements for fulfillment systems and often fail to prevent items from clogging loading systems. In some fulfillment systems, a conveyer assembly may be stopped to help prevent clogging or enable manual loading; however, by doing so, such systems may increase cycle time and energy costs for loading operations, while decreasing an achievable throughput of the fulfillment system. These downsides, among others, make traditional fulfillment systems inoperable for high-volume logistic environments.

Various embodiments of the present disclosure make important contributions to traditional fulfillment systems by addressing these technical challenges, among others.

BRIEF SUMMARY

Various embodiments of the present disclosure provide high-volume logistic systems and methods for using the same to improve the efficiency, throughput, cost, and maintenance for transporting small objects within a fulfillment system, such as a pharmaceutical fulfillment system. According to some embodiments of the present disclosure, a fulfillment system may include a conveyer assembly with one or more continuous flow systems, such as recirculation systems, which enable the continuous movement of items on a surface of the conveyer assembly. As described herein, the continuous motion of the items may be leveraged, with strategically placed partitions, to automatically direct and/or load items to one or more desired locations within the fulfillment system. In this way, small items, such as vials, may be continuously loaded within respective transportation carriers, such as pucks, without clogging a system or causing a conveyer assembly to stop or restart. This, in turn, may enable the elimination of electronically controlled gates, which may result in reduced system complexity, maintenance costs, and cycle times, while improving an achievable throughput of fulfillment systems.

In some embodiments, a method includes moving, using a first portion of a conveyer assembly, a plurality of container carriers to one or more carrier recirculation systems that are configured to recirculate the plurality of container carriers for one or more container carrier recirculation cycles; moving, using a second portion of the conveyer assembly, a plurality of item containers to a container recirculation system, positioned at least partially parallel to a carrier recirculation system of the one or more carrier recirculation systems, that is configured to recirculate the plurality of item containers for one or more item container recirculation cycles; moving, using a container partitioning assembly of the container recirculation system, an item container of the plurality of item containers into an induction system; moving, using a carrier partitioning assembly of the one or more carrier recirculation systems, a container carrier of the plurality of container carriers to a loading position relative to the induction system; and loading the item container into an interior portion of the container carrier.

In some embodiments, a system includes a first portion of a conveyer assembly configured to move a plurality of container carriers to one or more carrier recirculation systems that are configured to recirculate the plurality of container carriers for one or more container carrier recirculation cycles; a second portion of the conveyer assembly configured to move a plurality of item containers to a container recirculation system that is configured to recirculate the plurality of item containers for one or more item container recirculation cycles; a container partitioning assembly disposed relative to the container recirculation system to direct a movement of an item container of the plurality of item containers to an induction system; a carrier partitioning assembly disposed relative to the one or more carrier recirculation systems to direct a movement of a container carrier of the plurality of container carriers to a loading position relative to the induction system; and the induction system configured to load the item container into an interior portion of the container carrier.

In some embodiments, a conveyer assembly includes one or more carrier recirculation systems configured to recirculate a plurality of container carriers for one or more container carrier recirculation cycles; a container recirculation system positioned at least partially parallel to a carrier recirculation system and configured to recirculate a plurality of item containers for one or more item container recirculation cycles; a container partitioning assembly disposed relative to the container recirculation system to direct a movement of an item container of the plurality of item containers to an induction system; and a carrier partitioning assembly disposed relative to the one or more carrier recirculation systems to direct a movement of a container carrier of the plurality of container carriers to a loading position relative to the induction system.

DETAILED DESCRIPTION

Figure 1:
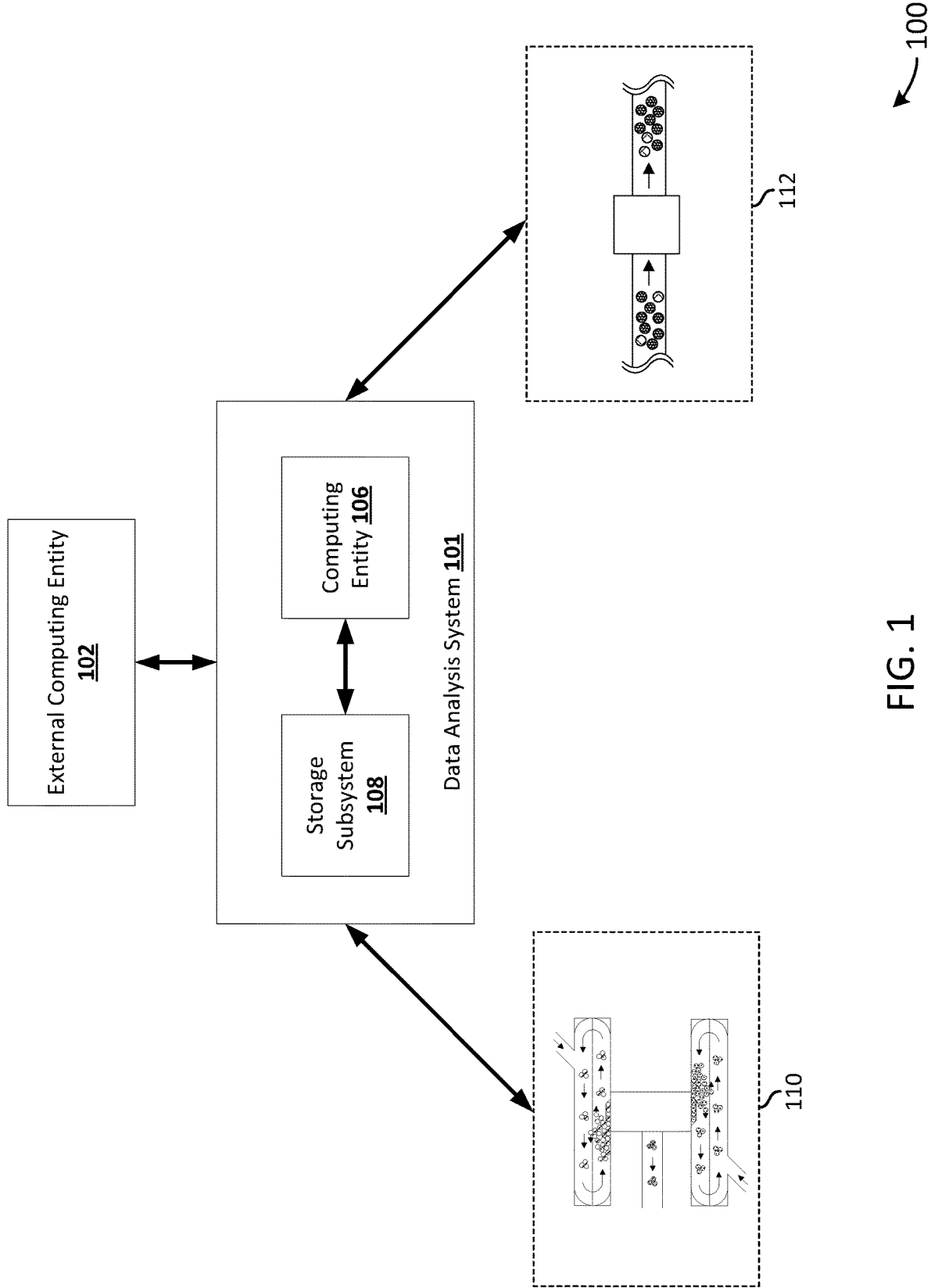
FIG. 1 provides an example overview of a system in accordance with one or more embodiments of the present disclosure.

Various embodiments of the present disclosure are described more fully hereinafter with reference to the accompanying drawings, in which some, but not all embodiments of the present disclosure are shown. Indeed, the present disclosure may be embodied in many different forms and should not be construed as limited to the embodiments set forth herein; rather, these embodiments are provided so that this disclosure will satisfy applicable legal requirements. The term "or" is used herein in both the alternative and conjunctive sense, unless otherwise indicated. The terms "illustrative" and "example" are used to be examples with no indication of quality level. Terms such as "computing," "determining," "generating," and/or similar words are used herein interchangeably to refer to the creation, modification, or identification of data. Further, "based on," "based at least in part on," "based at least on," "based upon," and/or similar words are used herein interchangeably in an open-ended manner such that they do not necessarily indicate being based only on or based solely on the referenced element or elements unless so indicated. Like numbers refer to like elements throughout. Moreover, while certain embodiments of the present disclosure are described with reference to predictive data analysis, one of ordinary skill in the art will recognize that the disclosed concepts can be used to perform other types of data analysis.

I. COMPUTER PROGRAM PRODUCTS, METHODS, AND COMPUTING ENTITIES

Embodiments of the present disclosure may be implemented in various ways, including as computer program products that comprise articles of manufacture. Such computer program products may include one or more software components including, for example, software objects, methods, data structures, or the like. A software component may be coded in any of a variety of programming languages. An illustrative programming language may be a lower-level programming language such as an assembly language associated with a particular hardware framework and/or operating system platform. A software component comprising assembly language instructions may require conversion into executable machine code by an assembler prior to execution by the hardware framework and/or platform. Another example programming language may be a higher-level programming language that may be portable across multiple frameworks. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query, or search language, and/or a report writing language. In one or more example embodiments, a software component comprising instructions in one of the foregoing examples of programming languages may be executed directly by an operating system or other software component without having to be first transformed into another form. A software component may be stored as a file or other data storage construct. Software components of a similar type or functionally related may be stored together such as in a particular directory, folder, or library. Software components may be static (e.g., pre-established or fixed) or dynamic (e.g., created or modified at the time of execution).

A computer program product may include non-transitory computer-readable storage medium storing applications, programs, program modules, scripts, source code, program code, object code, byte code, compiled code, interpreted code, machine code, executable instructions, and/or the like (also referred to herein as executable instructions, instructions for execution, computer program products, program code, and/or similar terms used herein interchangeably). Such non-transitory computer-readable storage media include all computer-readable media (including volatile and non-volatile media).

In one embodiment, a non-volatile computer-readable storage medium may include a floppy disk, flexible disk, hard disk, solid-state storage (SSS) (e.g., a solid-state drive (SSD)), solid state card (SSC), solid state module (SSM), enterprise flash drive, magnetic tape, or any other non-transitory magnetic medium, and/or the like. A non-volatile computer-readable storage medium may also include a punch card, paper tape, optical mark sheet (or any other physical medium with patterns of holes or other optically recognizable indicia), compact disc read only memory (CD-ROM), compact disc-rewritable (CD-RW), digital versatile disc (DVD), Blu-ray disc (BD), any other non-transitory optical medium, and/or the like. Such a non-volatile computer-readable storage medium may also include read-only memory (ROM), programmable read-only memory (PROM), erasable programmable read-only memory (EPROM), electrically erasable programmable read-only memory (EEPROM), flash memory (e.g., Serial, NAND, NOR, and/or the like), multimedia memory cards (MMC), secure digital (SD) memory cards, SmartMedia cards, CompactFlash (CF) cards, Memory Sticks, and/or the like. Further, a non-volatile computer-readable storage medium may also include conductive-bridging random access memory (CBRAM), phase-change random access memory (PRAM), ferroelectric random-access memory (FeRAM), non-volatile random-access memory (NVRAM), magnetoresistive random-access memory (MRAM), resistive random-access memory (RRAM), Silicon-Oxide-Nitride-Oxide-Silicon memory (SONOS), floating junction gate random access memory (FJG RAM), Millipede memory, racetrack memory, and/or the like.

In one embodiment, a volatile computer-readable storage medium may include random access memory (RAM), dynamic random access memory (DRAM), static random access memory (SRAM), fast page mode dynamic random access memory (FPM DRAM), extended data-out dynamic random access memory (EDO DRAM), synchronous dynamic random access memory (SDRAM), double data rate synchronous dynamic random access memory (DDR SDRAM), double data rate type two synchronous dynamic random access memory (DDR2 SDRAM), double data rate type three synchronous dynamic random access memory (DDR3 SDRAM), Rambus dynamic random access memory (RDRAM), Twin Transistor RAM (TTRAM), Thyristor RAM (T-RAM), Zero-capacitor (Z-RAM), Rambus in-line memory module (RIMM), dual in-line memory module (DIMM), single in-line memory module (SIMM), video random access memory (VRAM), cache memory (including various levels), flash memory, register memory, and/or the like. It will be appreciated that where embodiments are described to use a computer-readable storage medium, other types of computer-readable storage media may be substituted for or used in addition to the computer-readable storage media described above.

As should be appreciated, various embodiments of the present disclosure may also be implemented as methods, apparatuses, systems, computing devices, computing entities, and/or the like. As such, embodiments of the present disclosure may take the form of an apparatus, system, computing device, computing entity, and/or the like executing instructions stored on a computer-readable storage medium to perform certain steps or operations. Thus, embodiments of the present disclosure may also take the form of an entirely hardware embodiment, an entirely computer program product embodiment, and/or an embodiment that comprises combination of computer program products and hardware performing certain steps or operations.

Embodiments of the present disclosure are described below with reference to block diagrams and flowchart illustrations. Thus, it should be understood that each block of the block diagrams and flowchart illustrations may be implemented in the form of a computer program product, an entirely hardware embodiment, a combination of hardware and computer program products, and/or apparatuses, systems, computing devices, computing entities, and/or the like carrying out instructions, operations, steps, and similar words used interchangeably (e.g., the executable instructions, instructions for execution, program code, and/or the like) on a computer-readable storage medium for execution. For example, retrieval, loading, and execution of code may be performed sequentially such that one instruction is retrieved, loaded, and executed at a time. In some example embodiments, retrieval, loading, and/or execution may be performed in parallel such that multiple instructions are retrieved, loaded, and/or executed together. Thus, such embodiments can produce specifically configured machines performing the steps or operations specified in the block diagrams and flowchart illustrations. Accordingly, the block diagrams and flowchart illustrations support various combinations of embodiments for performing the specified instructions, operations, or steps.

II. EXAMPLE SYSTEM FRAMEWORK

FIG. 1 provides an example overview of a system 100 that can be used to practice embodiments of the present disclosure. The system 100 includes a data analysis system 101 comprising a computing entity 106 configured to generate outputs that can be used to perform one or more output-based actions. The data analysis system 101 may communicate with one or more external computing entities 102, one or more continuous flow systems 110, and one or more reordering systems 112 using one or more communication networks. Examples of communication networks include any wired or wireless communication network including, for example, a wired or wireless local area network (LAN), personal area network (PAN), metropolitan area network (MAN), wide area network (WAN), or the like, as well as any hardware, software and/or firmware required to implement it (e.g., network routers, and/or the like).

The system 100 includes a storage subsystem 108 configured to store at least a portion of the data utilized by the data analysis system 101. The computing entity 106 may be in communication with one or more external computing entities 102. In one example, the computing entity 106 may be configured to generate a prediction, classification, and/or any other data insight based on data provided by an external computing entity such as external computing entity 102.

The computing entity 106 may be configured to receive requests and/or data from the one or more external computing entities 102, process the requests and/or data to generate outputs (e.g., predictive outputs, classification outputs, and/or the like), and provide the outputs to at least one of the external computing entities 102. In some embodiments, the external computing entity 102, for example, periodically updates/provides raw and/or processed input data to the data analysis system 101. The external computing entities 102 may further generate user interface data (e.g., one or more data objects) corresponding to the outputs and may provide (e.g., transmit, send, and/or the like) the user interface data corresponding with the outputs for presentation to the external computing entity 102 (e.g., to an end user).

The storage subsystem 108 may be configured to store at least a portion of the data utilized by the computing entity 106 to perform one or more steps/operations and/or tasks described herein. The storage subsystem 108 may be configured to store at least a portion of operational data and/or operational configuration data including operational instructions and parameters utilized by the computing entity 106 to perform the one or more steps/operations described herein. The storage subsystem 108 may include one or more storage units, such as multiple distributed storage units that are connected through a computer network. Each storage unit in the storage subsystem 108 may store at least one of one or more data assets and/or data about the computed properties of one or more data assets. Moreover, each storage unit in the storage subsystem 108 may include one or more non-volatile storage or memory media including, but not limited to, hard disks, ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like.

In accordance with one or more examples as described herein, the system 100 may be an example of a fulfillment system for processing and otherwise filling pharmaceutical orders. The system 100 may include one or more components that decrease cycle time, reduce operational costs, and otherwise improve sorting and tracking of orders. For example, the system 100 may include one or more continuous flow systems 110, which may enable the continuous circulation and routing of item containers and container carriers. Such continuous flow systems 110 may enable the elimination of one or more electronically controlled gates, which may reduce system complexity, reduce maintenance costs, reduce cycle time, and conserve processing resources associated with controlling the one or more gates. Additionally, or alternatively, the continuous flow system 110 may enable continuous operation of one or more conveyers at a fixed speed, which may improve energy efficiency when compared to other systems that regularly start and stop.

In some examples, a continuous flow system 110 may be utilized to automatically move (e.g., route) item containers and container carriers into an induction system (e.g., for loading item containers into container carriers). For example, the continuous flow system 110 may include one or more conveyers that continuously circulate and queue container carriers for loading into the induction system. The continuous circulation may cause a portion of available container carriers to accumulate at an entrance point or opening of the induction system. In some examples, a partitioning assembly (e.g., one or more mechanical routing devices, one or more partitioning walls) may guide or route the container carriers into the induction system. The continuous flow system 110 may continuously move the container carriers into the induction system (e.g., based on availability of the container carriers). The induction system may have a second entrance point or opening, which may enable the continuous flow system 110 to load loading item containers into the induction system in the same fashion that container carriers are loaded into the induction system.

In some examples, the system 100 may additionally or alternatively include one or more reordering systems 112, which may enable item containers associated with a same order to be reordered and ultimately located adjacent to one another prior to being output by the system 100. Such reordering of item containers associated with a same order may reduce operational costs and improve processing efficiency. For example, reordering and locating item containers associated with a same order adjacent to one another prior to outputting the item containers may eliminate the need for item containers to be manually reordered subsequent to being output from the system 100. Additionally, or alternatively, the reordering system 112 may enable item containers associated with a same order to be incrementally reordered as they are conveyed throughout the system 100 (e.g., at times when other operations or tasks could not be performed), which may improve efficiency of the system 100.

In some examples, a reordering system 112 may include one or more conveyers, one or more holding systems, and one or more sensing systems. In one example, a plurality of container carriers may be transported along a conveyer. A first container carrier of the plurality of container carriers may include a first item container and a second container carrier of the plurality of container carriers may include a second item container. The first item container and the second item container may be associated with a same order. The first container carrier and the second container carrier may be separated by a first distance. Additionally, the first container carrier and the second container carrier may be separated by one or more intervening container carriers carrying item containers associated with different orders. The first container carrier, the second both, or both, may then be moved to a holding system, where one or more of the first container carrier and the second container carrier may be circulated for a duration. The holding system may then output the first container carrier, the second container carrier, or both, such that the first container carrier and the second container carrier are separated by a second distance less than the first distance. In some examples, the reordering system 112 may include multiple holding systems, such that a distance between container carriers associated with a same order may be incrementally decreased as the container carriers are conveyed throughout the system 100.

Example Computing Entity

Figure 2:
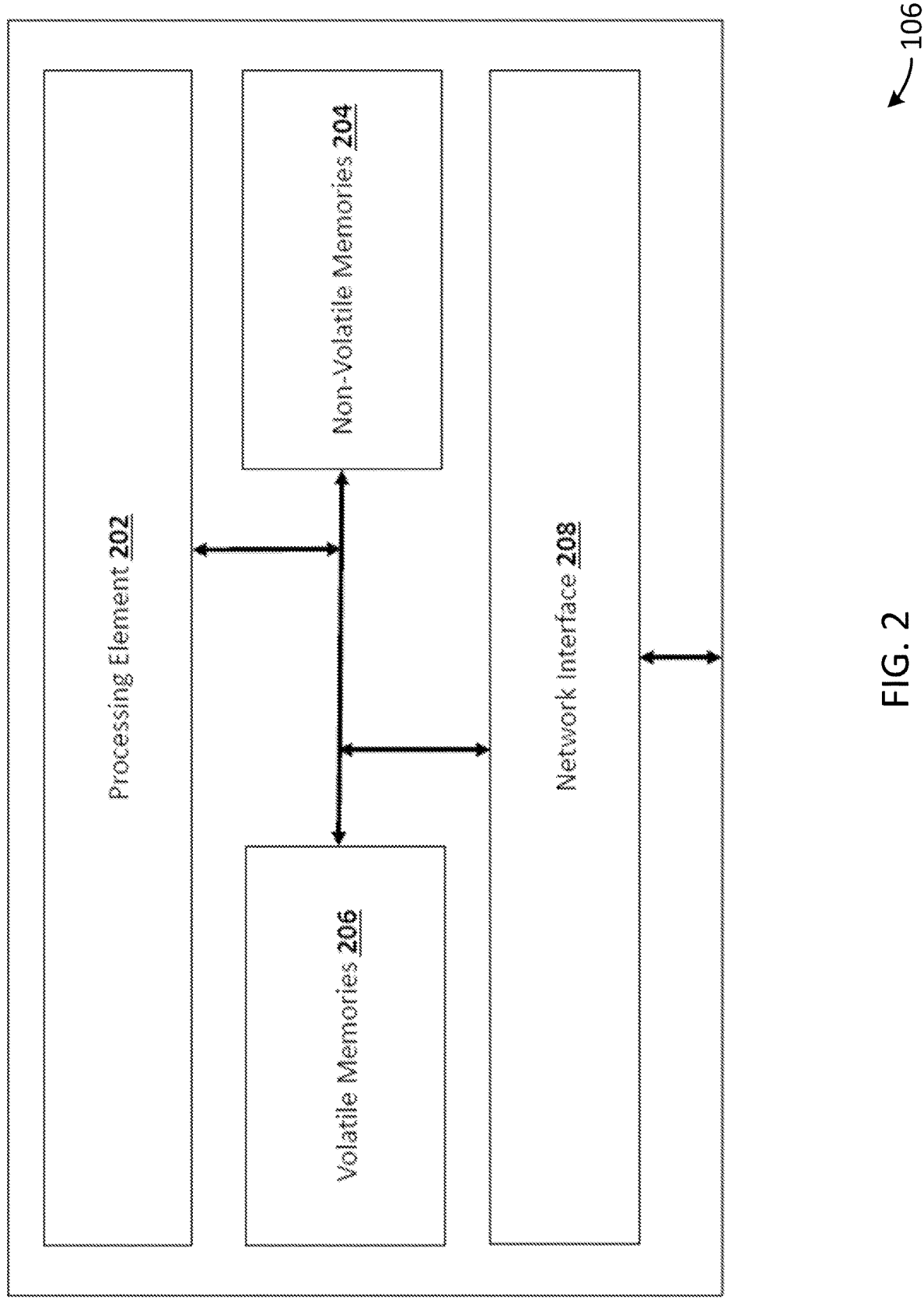
FIG. 2 provides an example computing entity in accordance with one or more embodiments of the present disclosure.

FIG. 2 provides an example computing entity 106 in accordance with some embodiments discussed herein. In general, the terms computing entity, computer, entity, device, system, and/or similar words used herein interchangeably may refer to, for example, one or more computers, computing entities, desktops, mobile phones, tablets, notebooks, laptops, distributed systems, kiosks, input terminals, servers or server networks, blades, gateways, switches, processing devices, processing entities, set-top boxes, relays, routers, network access points, base stations, the like, and/or any combination of devices or entities adapted to perform the functions, steps/operations, and/or processes described herein. Such functions, steps/operations, and/or processes may include, for example, transmitting, receiving, operating on, processing, displaying, storing, determining, creating/generating, monitoring, evaluating, comparing, and/or similar terms used herein interchangeably. In one embodiment, these functions, steps/operations, and/or processes can be performed on data, content, information, and/or similar terms used herein interchangeably.

The computing entity 106 may include a network interface 208 for communicating with various computing entities, such as by communicating data, content, information, and/or similar terms used herein interchangeably that can be transmitted, received, operated on, processed, displayed, stored, and/or the like.

In one embodiment, the computing entity 106 may include or be in communication with a processing element 202 (also referred to as processors, processing circuitry, and/or similar terms used herein interchangeably) that communicate with other elements within the computing entity 106 via a bus, for example. As will be understood, the processing element 202 may be embodied in a number of different ways including, for example, as at least one processor/processing apparatus, one or more processors/processing apparatuses, and/or the like.

For example, the processing element 202 may be embodied as one or more complex programmable logic devices (CPLDs), microprocessors, multi-core processors, coprocessing entities, application-specific instruction-set processors (ASIPs), microcontrollers, and/or controllers. Further, the processing element 202 may be embodied as one or more other processing devices or circuitry. The term circuitry may refer to an entirely hardware embodiment or a combination of hardware and computer program products. Thus, the processing element 202 may be embodied as integrated circuits, application specific integrated circuits (ASICs), field programmable gate arrays (FPGAs), programmable logic arrays (PLAs), hardware accelerators, other circuitry, and/or the like.

As will therefore be understood, the processing element 202 may be configured for a particular use or configured to execute instructions stored in one or more memory elements including, for example, one or more volatile memories 206 and/or non-volatile memories 204. As such, whether configured by hardware or computer program products, or by a combination thereof, the processing element 202 may be capable of performing steps or operations according to embodiments of the present disclosure when configured accordingly. The processing element 202, for example in combination with the one or more volatile memories 206 and/or or non-volatile memories 204, may be capable of implementing one or more methods or computer-implemented methods as described herein. In some implementations, the computing entity 106 can include a computing apparatus, the processing element 202 can include at least one processor of the computing apparatus, and the one or more volatile memories 206 and/or non-volatile memories 204 can include at least one memory including program code. The at least one memory and the program code can be configured to, upon execution by the at least one processor, cause the computing apparatus to perform one or more steps/operations described herein.

The non-volatile memories 204 (also referred to as non-volatile storage, memory, memory storage, memory circuitry, media, and/or similar terms used herein interchangeably) may include at least one non-volatile memory device 204, including, but not limited to, hard disks, ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like.

As will be recognized, the non-volatile memories 204 may store databases, database instances, database management systems, data, applications, programs, program modules, scripts, source code, object code, byte code, compiled code, interpreted code, machine code, executable instructions, and/or the like. The term database, database instance, database management system, and/or similar terms used herein interchangeably may refer to a collection of records or data that is stored in a computer-readable storage medium using one or more database models, such as a hierarchical database model, network model, relational model, entity-relationship model, object model, document model, semantic model, graph model, and/or the like.

The one or more volatile memories (also referred to as volatile storage, memory, memory storage, memory circuitry, media, and/or similar terms used herein interchangeably) can include at least one volatile memory 206 device, including, but not limited to, RAM, DRAM, SRAM, FPM DRAM, EDO DRAM, SDRAM, DDR SDRAM, DDR2 SDRAM, DDR3 SDRAM, RDRAM, TTRAM, T-RAM, Z-RAM, RIMM, DIMM, SIMM, VRAM, cache memory, register memory, and/or the like.

As will be recognized, the volatile memories 206 may be used to store at least portions of the databases, database instances, database management systems, data, applications, programs, program modules, scripts, source code, object code, byte code, compiled code, interpreted code, machine code, executable instructions, and/or the like being executed by, for example, the processing element 202. Thus, the databases, database instances, database management systems, data, applications, programs, program modules, scripts, source code, object code, byte code, compiled code, interpreted code, machine code, executable instructions, and/or the like may be used to control certain embodiments of the operation of the computing entity 106 with the assistance of the processing element 202.

As indicated, in one embodiment, the computing entity 106 may also include the network interface 208 for communicating with various computing entities, such as by communicating data, content, information, and/or the like that can be transmitted, received, operated on, processed, displayed, stored, and/or the like. Such communication data may be executed using a wired data transmission protocol, such as fiber distributed data interface (FDDI), digital subscriber line (DSL), Ethernet, asynchronous transfer mode (ATM), frame relay, data over cable service interface specification (DOCSIS), or any other wired transmission protocol. Similarly, the computing entity 106 may be configured to communicate via wireless client communication networks using any of a variety of protocols, such as general packet radio service (GPRS), Universal Mobile Telecommunications System (UMTS), Code Division Multiple Access 2000 (CDMA2000), CDMA2000 1× (1×RTT), Wideband Code Division Multiple Access (WCDMA), Global System for Mobile Communications (GSM), Enhanced Data rates for GSM Evolution (EDGE), Time Division-Synchronous Code Division Multiple Access (TD-SCDMA), Long Term Evolution (LTE), Evolved Universal Terrestrial Radio Access Network (E-UTRAN), Evolution-Data Optimized (EVDO), High Speed Packet Access (HSPA), High-Speed Downlink Packet Access (HSDPA), IEEE 802.11 (Wi-Fi), Wi-Fi Direct, 802.16 (WiMAX), ultra-wideband (UWB), infrared (IR) protocols, near field communication (NFC) protocols, Wibree, Bluetooth protocols, wireless universal serial bus (USB) protocols, and/or any other wireless protocol.

In accordance with one or more examples as described herein, the computing entity 106 may perform one or more operations that enable the continuous circulation and routing of vials and container carriers. For example, the computing entity 106 may transmit (e.g., via the network interface 208), one or more control signals to a continuous flow system 110, which may cause the continuous circulation of vials and container carriers. The control signal may indicate that the continuous flow system 110 is to be turned on or operated at fixed speed, which may improve energy efficiency when compared to other systems that regularly start and stop. In some examples, the computing entity 106 may transmit the control signal to an external computing entity 102, which may be in communication with the continuous flow system 110.

In some examples, the computing entity 106 may cause one or more operations to occur at one or more reordering systems 112, which may enable vials associated with a same order to be reordered and ultimately located adjacent to one another prior to being output by the fulfillment system. For example, the computing entity 106 may transmit (e.g., via the network interface 208) a control signal that causes one or more container carriers to be moved to a holding system. In some examples, the computing entity 106 may receive information from one or more external computing entities 102 in communication with the one or more reordering systems and determine to transmit the control signal based on the information. For example, the computing entity 106 may receive an indication of a distance between two container carriers associated with a same order and may determine to transmit a control signal that causes one or more of the two container carriers to be moved to a holding system based on the distance (e.g., based on the distance achieving a threshold distance). A distance may achieve a threshold distance in the event that it is equal to or exceeds the threshold distance. The indication may be received from an external computing entity 102, which may be an example of or may be in communication with one or more sensing systems.

Example External Computing Entity

Figure 3:
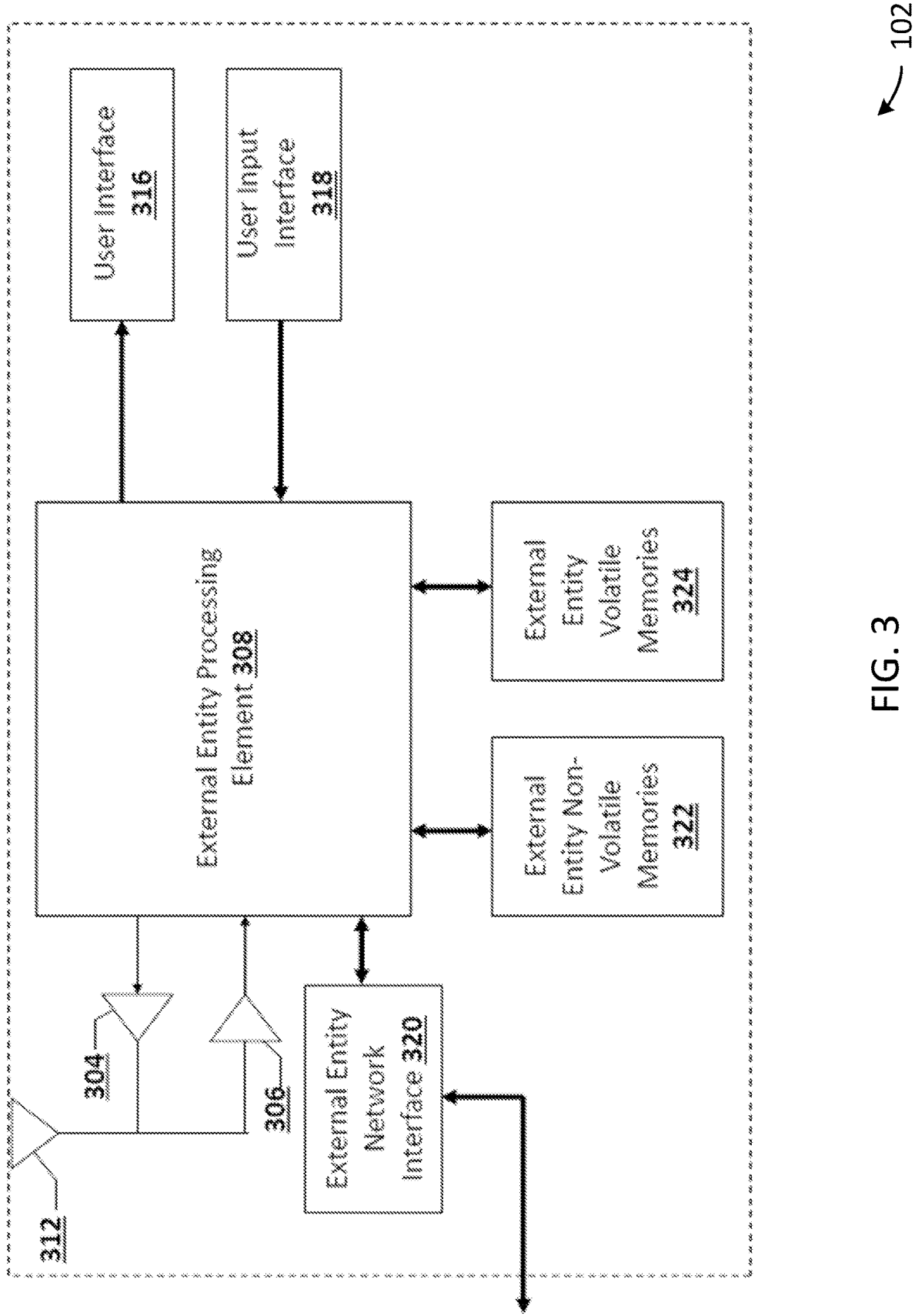
FIG. 3 provides an example external computing entity in accordance with one or more embodiments of the present disclosure.

FIG. 3 provides an example external computing entity 102 in accordance with some embodiments discussed herein. In general, the terms device, system, computing entity, entity, and/or similar words used herein interchangeably may refer to, for example, one or more computers, computing entities, desktops, mobile phones, tablets, phablets, notebooks, laptops, distributed systems, kiosks, input terminals, servers or server networks, blades, gateways, switches, processing devices, processing entities, set-top boxes, relays, routers, network access points, base stations, the like, and/or any combination of devices or entities adapted to perform the functions, steps/operations, and/or processes described herein. The external computing entities 102 can be operated by various parties. As shown in FIG. 3, the external computing entity 102 can include an antenna 312, a transmitter 304 (e.g., radio), a receiver 306 (e.g., radio), and/or an external entity processing element 308 (e.g., CPLDs, microprocessors, multi-core processors, coprocessing entities, ASIPs, microcontrollers, and/or controllers) that provides signals to and receives signals from the transmitter 304 and the receiver 306, correspondingly. As will be understood, the external entity processing element 308 may be embodied in a number of different ways including, for example, as at least one processor/processing apparatus, one or more processors/processing apparatuses, and/or the like as described herein with reference the processing element 202.

The signals provided to and received from the transmitter 304 and the receiver 306, correspondingly, may include signaling information/data in accordance with air interface standards of applicable wireless systems. In this regard, the external computing entity 102 may be capable of operating with one or more air interface standards, communication protocols, modulation types, and access types. More particularly, the external computing entity 102 may operate in accordance with any of a number of wireless communication standards and protocols, such as those described above with regard to the computing entity 106. In a particular embodiment, the external computing entity 102 may operate in accordance with multiple wireless communication standards and protocols, such as UMTS, CDMA2000, 1×RTT, WCDMA, GSM, EDGE, TD-SCDMA, LTE, E-UTRAN, EVDO, HSPA, HSDPA, Wi-Fi, Wi-Fi Direct, WiMAX, UWB, IR, NFC, Bluetooth, USB, and/or the like. Similarly, the external computing entity 102 may operate in accordance with multiple wired communication standards and protocols, such as those described above with regard to the computing entity 106 via an external entity network interface 320.

Via these communication standards and protocols, the external computing entity 102 can communicate with various other entities using means such as Unstructured Supplementary Service Data (USSD), Short Message Service (SMS), Multimedia Messaging Service (MMS), Dual-Tone Multi-Frequency Signaling (DTMF), and/or Subscriber Identity Module Dialer (SIM dialer). The external computing entity 102 can also download changes, add-ons, and updates, for instance, to its firmware, software (e.g., including executable instructions, applications, program modules), operating system, and/or the like.

According to one embodiment, the external computing entity 102 may include location determining embodiments, devices, modules, functionalities, and/or the like. For example, the external computing entity 102 may include outdoor positioning embodiments, such as a location module adapted to acquire, for example, latitude, longitude, altitude, geocode, course, direction, heading, speed, universal time (UTC), date, and/or various other information/data. In one embodiment, the location module can acquire data such as ephemeris data, by identifying the number of satellites in view and the relative positions of those satellites (e.g., using global positioning systems (GPS)). The satellites may be a variety of different satellites, including Low Earth Orbit (LEO) satellite systems, Department of Defense (DOD) satellite systems, the European Union Galileo positioning systems, the Chinese Compass navigation systems, Indian Regional Navigational satellite systems, and/or the like. This data can be collected using a variety of coordinate systems, such as the Decimal Degrees (DD); Degrees, Minutes, Seconds (DMS); Universal Transverse Mercator (UTM); Universal Polar Stereographic (UPS) coordinate systems; and/or the like. Alternatively, the location information/data can be determined by triangulating a position of the external computing entity 102 in connection with a variety of other systems, including cellular towers, Wi-Fi access points, and/or the like. Similarly, the external computing entity 102 may include indoor positioning embodiments, such as a location module adapted to acquire, for example, latitude, longitude, altitude, geocode, course, direction, heading, speed, time, date, and/or various other information/data. Some of the indoor systems may use various position or location technologies including RFID tags, indoor beacons or transmitters, Wi-Fi access points, cellular towers, nearby computing devices (e.g., smartphones, laptops) and/or the like. For instance, such technologies may include the iBeacons, Gimbal proximity beacons, Bluetooth Low Energy (BLE) transmitters, NFC transmitters, and/or the like. These indoor positioning embodiments can be used in a variety of settings to determine the location of someone or something to within inches or centimeters.

The external computing entity 102 may include a user interface 316 (e.g., a display, speaker, and/or the like) that can be coupled to the external entity processing element 308. In addition, or alternatively, the external computing entity 102 can include a user input interface 319 (e.g., keypad, touch screen, microphone, and/or the like) coupled to the external entity processing element 308).

For example, the user interface 316 may be a user application, browser, and/or similar words used herein interchangeably executing on and/or accessible via the external computing entity 102 to interact with and/or cause the display, announcement, and/or the like of information/data to a user. The user input interface 318 can comprise any of a number of input devices or interfaces allowing the external computing entity 102 to receive data including, as examples, a keypad (hard or soft), a touch display, voice/speech interfaces, motion interfaces, and/or any other input device. In embodiments including a keypad, the keypad can include (or cause display of) the conventional numeric (0-9) and related keys (#, *, and/or the like), and other keys used for operating the external computing entity 102 and may include a full set of alphabetic keys or set of keys that may be activated to provide a full set of alphanumeric keys. In addition to providing input, the user input interface 318 can be used, for example, to activate or deactivate certain functions, such as screen savers, sleep modes, and/or the like.

The external computing entity 102 can also include one or more external entity non-volatile memories 322 and/or one or more external entity volatile memories 324, which can be embedded within and/or may be removable from the external computing entity 102. As will be understood, the external entity non-volatile memories 322 and/or the external entity volatile memories 324 may be embodied in a number of different ways including, for example, as described herein with reference the non-volatile memories 204 and/or the external volatile memories 206.

In accordance with one or more examples as described herein, the external computing entity 102 may perform one or more operations that enable the continuous circulation and routing of item containers and container carriers. For example, the external computing entity 102 may transmit (e.g., via the external entity network interface 320), one or more control signals to a continuous flow system 110, which may cause the continuous circulation of item containers and container carriers. The control signal may indicate that the continuous flow system 110 is to be turned on or operated at fixed speed, which may improve energy efficiency when compared to other systems that regularly start and stop. In some examples, the external computing entity 102 may transmit the control signal to the computing entity 106, which may be in communication with the continuous flow system 110.

In some examples, the external computing entity 102 may cause one or more operations to occur at one or more reordering systems 112, which may enable item containers associated with a same order to be reordered and ultimately located adjacent to one another prior to being output by the fulfillment system. For example, the external computing entity 102 may transmit (e.g., via the external entity network interface 320) a control signal that causes one or more container carriers to be moved to a holding system. In some examples, the external computing entity 102 may receive information from computing entities 106 in communication with the one or more reordering systems and determine to transmit the control signal based on the information. For example, the external computing entity 102 may receive an indication of a distance between two container carriers associated with a same order and may determine to transmit a control signal that causes one or more of the two container carriers to be moved to a holding system based on the distance (e.g., based on the distance satisfying a threshold distance). The indication may be received from a computing entity 106, which may be an example of or may be in communication with one or more sensing systems.

III. EXAMPLES OF CERTAIN TERMS

In some embodiments, the term "fulfillment system" refers to a system for handling orders for items. A fulfillment system, for example, may include a plurality of logistic components for a distribution center in which items are moved, processed, and grouped in one or more packages to fulfill an order. In this respect, the logistic components may be strategically placed within the distribution center to optimize a throughput, or other logistic considerations of the fulfillment system. Logistic components, for example, may include conveyer assemblies, packaging areas, item processing areas, and/or the like that are configured to efficiently and reliably transition an item from a storage location to an end user. By way of example, a fulfillment system may include a pharmaceutical fulfillment system configured to move pharmaceutical items, such as pill vials, and/or the like, from a storage location to a package that may dispatched to an end user. A pharmaceutical fulfillment system may include various logistic components, such as conveyer assemblies, induction systems, sorting systems, vial-filling systems, and/or the like that are collectively configured to fill a pill vial and then transport the filled vial (e.g., in a puck) to a package in accordance with an order for one or more medications.

In some embodiments, the term "order" refers to a data entity that describes one or more items for an end user (e.g., an individual person, an organization, such as a pharmacy, etc.). In some examples, an order may be associated with a plurality of items that may originate at one or more different locations within the fulfillment system. To fulfill an order, the fulfillment system may group the plurality of items into a common package for dispatch to the end user.

As an example, an order for a pharmaceutical fulfillment system may describe one or more different medications for an end user. In some examples, to originate an item for the order, a plurality of medications, such as pill capsules, may be loaded into one or more vials or other containers. Accordingly, an order may be associated with a plurality of vials, or other containers, that each contain a portion of the order (e.g., one of the one or more different medications). To fulfill an order, the pharmaceutical fulfillment system may group the plurality of vials into a common package for dispatch to the end user.

In some embodiments, the term "end user" refers to an originator of an order. An entity may be an individual (e.g., patient, customer, etc.), a business (e.g., pharmacy, clinic, etc.), and/or the like. An end user may be associated with a physical location to which a plurality of different item containers may be delivered to fulfil an order.

In some embodiments, the term "item container" refers to a physical object with an interior portion defined by a plurality of exterior walls. The object may be designed to contain one or more items. An item container, for example, may include a package, tote, box, tube, and/or the like for containing a plurality of items in a common space. In some examples, an item container may define a closed interior portion to contain the plurality of items in a closed environment.

As an example, in a pharmaceutical fulfillment system, an item container may include a vial, such as a pill vial for holding a plurality of pill capsules. A vial, for example, may include a cylindrical container with curved side walls, a floor, and a removeable cap disposed opposite to the floor that defines an interior portion of the vial. As described herein, the interior portion of the vial may be at least partially filled with a plurality of items, such as pill capsules, to group and then collectively move the plurality of items across the pharmaceutical fulfillment system.

In some examples, an item container, such as a pill vial, may include a small item that may be unstable (e.g., subject to falling, rolling, etc.) and/or difficult to track across a fulfillment system. In accordance with some embodiments of the present disclosure, to improve the stability and/or trackability of an item container as it is moved across the fulfillment system, an item container may be temporarily placed at least partially within an interior portion of another, larger object. For instance, an item container may be placed within a container carrier.

In some embodiments, the term "container carrier" refers to a physical object with an interior portion defined by one or more interior walls and an exterior portion defined by one or more of exterior walls. A container carrier, for example, may include an interior portion that is compatible with an item container. For example, a diameter, length, and/or the like of the interior portion may be based on a diameter, length, and/or the like of an item container such that the item container may be placed within the interior portion. In addition, or alternatively, the container carrier may include an exterior portion that is larger than the item container to add stability to the item container as it traverses through a fulfillment system. A container carrier, for example, may be used to hold, support, and/or the like one or more item containers.

By way of example, a container carrier may include a transportation puck that is compatible with a vial. A transportation puck may include cylindrical exterior and/or interior portions. For instance, the transportation puck may be cylindrical and may include a cylindrical cavity (e.g., the interior portion) where a vial may be placed. In this respect, a diameter of the interior portion may be based on a diameter of a vial. In some other examples, a transportation puck may include a plurality of cylindrical cavities, where each cylindrical cavity may hold a respective vial. Although some pucks may be cylindrical, other puck geometries may be utilized. For example, a puck may be rectangular or square.

In some embodiments, a container carrier includes one or more tracking mechanisms for identifying a location of the container carrier (and/or an item container, a plurality of items therein, etc.) within the fulfillment system. The one or more tracking mechanisms, for example, may include one or more radio-frequency identification (RFID) tags, barcodes, and/or the like.

In some embodiments, the term "carrier container pair" refers to a container carrier with an item container placed at least partially therein. A carrier container pair may be transported across a fulfillment system to move and track an item container (and/or a plurality of items therein). In some examples, a carrier container pair may be originated by an induction system that is configured to place an item container at least partially within a container carrier.

In some embodiments, the term "induction system" refers to a component of a fulfillment system that is configured to label and then place an item container within a container carrier. An induction system, for example, may include an item container labeler, such as a vial labeler, that is configured to adhere a label to an item container that describes one or more contents (e.g., a plurality of items) within and/or assigned to the item container. By way of example, an induction system may receive an empty item container, print a label for the item container, apply the label to the item container, and then drop the item container into a container carrier for transportation to a location for filling the item container with one or more items described by the item label.

An induction system may include one or more openings for objects to enter and/or exit an interior chamber of the induction system (e.g., a labeling chamber, etc.). The one or more openings, for example, may include an ingress point and an egress point. In some examples, an item container may enter the induction system through an ingress point and exit through the egress point. In some embodiments, an ingress point is located at a top portion of an induction system and an egress point is located at a bottom portion of the induction system. An item container may enter the interior chamber of the induction system by dropping through the ingress point. In some examples, an item container may be prevented from dropping through the ingress point in the event that another item container is located within the interior chamber. For instance, a currently loaded item container may act as a barrier to the entrance of a subsequent item container. The subsequent item container may drop (e.g., based on a gravitational force, etc.) into the interior chamber as the currently loaded item container exits the interior chamber. In this manner, the interior chamber of an induction system may continuously cycle through a plurality of item containers.

In some examples, an item container may be held (e.g., using a mechanical arm, gate, trap door, etc.) within an induction chamber to apply a label to the item container. Once the label is applied, the item container may be dropped through the egress point to exit the induction chamber and allow the entrance of a subsequent item container.

In some examples, a container carrier may be positioned at a loading position relative to the induction system to receive an item container as the item container exits the induction system. By way of example, the loading position may be located below an egress point of the induction chamber such that an item container may be placed (e.g., dropped, loaded, etc.) within an interior portion of a container carrier as the item container exits the induction system.

In some embodiments, an induction system is coupled with one or more other components of a fulfillment system to facilitate a continuous movement of a plurality of item containers and container carriers relative to the induction system. The one or more other components, for example, may include one or more partitioning assemblies and/or conveyer systems collectively configured to move an item container to an ingress point and a container carrier to an egress point of an induction system. For example, an item container and/or container carrier may be continuously moved by a conveyer system and directed to an ingress and egress point of an induction system by a partitioning assembly. For example, a partitioning assembly (and/or one or more partitioning walls thereof) may cause a formation of a queue of item containers adjacent to an ingress point of an induction system. As additional item containers are directed into the queue, one or more item containers in the queue may be pushed into the induction chamber (e.g., by another item container, the conveyer, or both).

In some embodiments, the term "partitioning wall" refers to a component of a fulfillment system that is used for routing or directing a movement of an object. In some examples, a partitioning wall may be fixed (e.g., a partitioning wall may not move or have any moving parts). In addition, or alternatively, a partitioning wall may be movable (e.g., include a hinge, etc.). A partitioning wall may be an example of a type of routing device, such as a mechanical routing device, which may be different from some other types of routing devices (e.g., electronically controlled routing devices). A partitioning wall may route or otherwise direct an object, such as an item container and/or container carrier, from a first component of a fulfillment system (e.g., a recirculation system) to a second component of a fulfillment system (e.g., an induction chamber).

In some examples, a partitioning wall may direct an object as it is moved by conveyer assembly. For example, a partitioning wall may adjust or alter a path of an object as the object travels along a conveyer. In some examples, a partitioning wall may route an object from one conveyer to another conveyer (e.g., from a first portion of a conveyer assembly to a second portion of a conveyer assembly). In some examples, two or more partitioning walls may be utilized (e.g., in conjunction with one another) to route an object.

In some embodiments, the term "partitioning assembly" refers to one or more partitioning walls utilized to route, redirect, and/or the like an object with respect to another component of a fulfillment system. In some examples, a partitioning assembly may include one or more partitioning walls that are located relative to one another to direct an object's direction of movement. A partitioning assembly, for example, may include one or more partitioning walls relative to an induction system that are configured to direct an object to an ingress or egress point of the induction system. A partitioning assembly, for example, may include carrier partitioning assembly that is positioned on a conveyer assembly (e.g., a carrier recirculation system) to direct a container carrier to a loading position for one or more induction systems. In addition, or alternatively, a partitioning assembly may include a container partitioning assembly that is positioned on a conveyer assembly (e.g., a container recirculation system) to direct an item container to an ingress point for one or more induction systems. As described herein, a plurality of partitioning assemblies may be strategically placed at one or more locations of a conveyer assembly to leverage a continuous movement of a plurality of item containers and container carriers for positioning the containers and carriers with respect to one or more induction systems without stopping an operation of the conveyer assembly.

In some embodiments, the term "conveyer assembly" refers to a component of the fulfillment system that is configured to move (e.g., through friction or other forces) item containers, container carriers, and/or the like to, from, and/or between one or more locations within the fulfillment system. In some examples, a conveyer assembly may include an assembly, arrangement, system, and/or the like that includes a plurality of conveyers. In some examples, a conveyer assembly may include an end-to-end closed conveyance system that is configured to transport (e.g., move, route, etc.) a plurality of objects (e.g., item containers, container carriers, combinations thereof, etc.) between one or more points within a fulfillment system. The conveyer assembly may include a plurality of at least partially connected portions, each configured to move a plurality of objects (e.g., item containers, container carriers, combinations thereof, etc.) to, from, and/or between multiple points within the fulfillment system. In some examples, one or more portions of the conveyer assembly may be connected by one or more other systems, such as an induction system, as described herein.

In some embodiments, a conveyer assembly includes a plurality of portions that respectively correspond to one or more areas within a fulfillment system. For instance, each portion may include one or more conveyers that are configured to move an object, directly or indirectly, from an origin location to a destination location associated with a respective area. To do so, each of the one or more portions of the conveyer assembly may include one or more recirculation and/or direct conveyer systems.

As described herein, a recirculation conveyer system may include an at least partially looped conveyer in which an object may complete one or more recirculation cycles without moving from a portion of the conveyer assembly. A direct conveyer system may include a directed section of conveyer that moves an object from an origin to a destination location. An object may be moved between portions of the conveyer assembly using a direct conveyer system. For example, a direct conveyer system may include an induction exiting system configured to move an item container, a container carrier, and/or one or more combinations thereof from an induction system to a subsequent portion of a conveyer assembly.

Various embodiments described herein provide a conveyer assembly that provides advantages when compared to conventional conveyer systems. For example, the conveyer assembly may be configured to facilitate more efficient, effective, and accurate processing of connected orders, such as pharmaceutical orders, in which a plurality of objects (e.g., item containers) are aggregated, transported, and collectively packaged for a single end user. For example, the conveyer assembly described herein may include one or more components that decrease cycle time, reduce operational costs, and otherwise improve sorting and tracking of orders. To do so, the conveyer assembly may include one or more continuous flow systems (e.g., recirculation systems) that enable the continuous circulation and routing of compatible objects (e.g., item containers, container carriers, etc.). By maintaining a continuous movement of the objects, the conveyer assembly may leverage forces exerted by the object themselves to replace traditional electronically controlled gates with mechanical routing mechanisms, which reduce system complexity, maintenance costs, and cycle time, while conserving processing resources, and improving overall system throughput as well as energy efficiency.

In some embodiments, the term "conveyer" refers to a component of the conveyer assembly. A conveyer may include one or more moving surfaces (e.g., one or more belts, one or more rollers, etc.), which may exert one or more directional forces on one or more objects placed on the conveyer. In some examples, a conveyer may be controlled by a control system. It should be understood that a conveyer or conveyer belt, as described herein, may be configured as a conventional conveyer belt, such that it is formed and/or extended around at least two driving wheels. By turning the driving wheels, the conveyer belt may run cyclically (e.g., continuously around the driving wheels). The conveyer belt may thus, like conventional belts of this nature, be made from a multitude of materials, linkages, and so forth, so as to achieve a desired combination of durability and flexibility thereof.

In some embodiments, the term "recirculation system" refers to a configuration of conveyers within a portion of a conveyer assembly that transports, conveys, etc. an object along a looped (e.g., continuous) path. Stated another way, a recirculation system may transport an object from an origin location to one or more other points and then back to the origin location. An object in a recirculation system may follow a circular path or an irregular, non-circular path. To do so, a recirculation system may have one of one or more different configurations. A first configuration may include a plurality of conveyers placed at one or more angles to collectively form a looped path. In addition, or alternatively, a second configuration may include two sets of conveyers that move in opposite directions. For instance, the second configuration may include a first set of linear conveyers and a second set of linear conveyers that may apply opposite directional forces to objects disposed on a surface of the respective sets of linear conveyers. The first set of conveyers may be adjacent to the second set of conveyers such that an object may be moved (e.g., by making contact with a partition, by one or more looped conveyers, etc.) from the first set of conveyers to the second set of conveyers. The first set of conveyers may be configured to transport objects in a first direction and the second set of conveyers may be configured to transport objects in a second direction parallel to and opposite of the second direction to form a continuous loop.

In one illustrative example of the second configuration, an object may travel on the first set of conveyers in the first direction until the object is slid or is pushed (e.g., by another object, by a partitioning wall, by one or more looped conveyers, etc.) onto the second set of conveyers. The second set of conveyers may then move the object in the second, opposite direction. In such examples, the object may be said to recirculate by way of switching from the first set of conveyers to the second set of conveyers and reversing direction. In some examples, the object may recirculate or otherwise switch between conveyers continuously until the object is moved from both sets of conveyers.

In some embodiments, a recirculation system includes one or more entry and/or exit points. For example, an object may be moved to a recirculation system (e.g., onto a conveyer surface of the recirculation system, etc.) via an entry point and may be moved from the recirculation system via an exit point. An entry point, for example, may include a gate (e.g., a mechanical gate, an electronic gate, etc.), a partitioning wall, and/or the like that may be controlled and/or configured to direct an object to a recirculation system. An exit point may include a gate (e.g., a mechanical gate, an electronic gate, etc.), a partitioning wall, and/or the like that may be controlled and/or configured to direct an object from a recirculation system.

A conveyer assembly may include a plurality of recirculation systems of different types to continuously move objects within one or more portions of the conveyer assembly. For instance, the recirculation systems may include one or more carrier recirculation systems, one or more container recirculation systems, one or more holding systems, and/or the like. Each of the recirculation systems may include entry and/or exit points that are configured for a particular task. By way of example, a carrier recirculation system, such as a carrier loading system, and/or a container recirculation system may include a plurality of exit points that are respectively associated with partitioning assemblies configured to leverage a continuous motion of objects (e.g., possible by the cyclic design of the recirculation systems) within the recirculation systems to automatically position the objects to exit the recirculation systems and enter an induction system.

By way of example, a partitioning assembly relative to an exit point of a recirculation system may cause an object to be moved from of the recirculation system based on a position of the object relative to a width and/or sidewall of the recirculation system. For example, a partitioning assembly may be configured to intercept and route an object located on a portion of a conveyer of a recirculation system (e.g., located along a sidewall of the conveyer or within a certain distance from the sidewall of the conveyer) from the recirculation system (e.g., to a position relative to an induction system, etc.).

In some embodiments, the term "recirculation cycle" refers to a movement of an object from an origin location back to the origin location. A recirculation cycle may be completed as an object is moved by an at least partially circular set of conveyers. In addition, or alternatively, a recirculation cycle may be completed by changing a direction of motion of an object by transferring the object between two conveyers operating in opposite directions. By way of example, a recirculation cycle may include one or more changes in a conveyance direction of an object in a recirculation system. For instance, a recirculation cycle may be associated with or correspond to an object moving from a first conveyer (e.g., conveying the object in a first direction) to a second conveyer (e.g., conveying the object in a second direction). An object may complete a recirculation cycle if the object changes direction one or more times to move from an origin location back to the origin location.

In some embodiments, the term "container recirculation system" refers to a recirculation system that is designed to recirculate item containers at one or more portions of the conveyer assembly. As described herein, a container recirculation system may be configured to recirculate a plurality of item containers such that they complete one or more container recirculation cycles. In some examples, a container recirculation system may include one or more partitioning assemblies that may direct one or more of a plurality of recirculating item containers into one or more loading areas (e.g., a container loading area, etc.). By doing so, a container recirculation system may cause a continuous movement of item containers to automatically and continuously feed into one or more induction systems.

In some embodiments, the term "carrier recirculation system" refers to a recirculation system that is designed to recirculate container carriers at one or more portions of the conveyer assembly. As described herein, a carrier recirculation system may be configured to recirculate a plurality of container carriers such that they complete one or more carrier recirculation cycles. By doing so, a carrier recirculation system may cause continuous movement of container carriers, which may automatically and continuously feed the container carriers into loading positions relative to the one or more induction systems.

In some embodiments, the term "loading recirculation system" refers to a type of a carrier recirculation system. A loading recirculation system may be configured to continuously move container carriers as they are moved into loading positions relative to one or more induction systems. For example, a loading recirculation system may include one or more partitioning assemblies that may direct one or more of a plurality of recirculating container carriers into one or more loading areas (e.g., carrier loading areas, etc.).

In some examples, a loading recirculation system may exchange container carriers with another carrier recirculation system to complete a carrier recirculation cycle. For instance, a loading recirculation system may receive container carrier from one or more other components of a fulfillment system, such as a carrier source, which may form another example of a recirculation system. In some examples, a loading recirculation system may receive a plurality of container carriers from an overflow recirculation system. Additionally, or alternatively, the loading recirculation system may move one or more container carriers into the overflow recirculation system (e.g., if the one or more container carriers are not loaded into an induction system during a recirculation cycle).

In some embodiments, the term "overflow recirculation system" refers to a type of carrier recirculation system. In some examples, an overflow recirculation system may be configured to recirculate a plurality of container carriers received from one or more different portions of a conveyer assembly. For instance, the conveyer assembly may form a closed system with a plurality of container carriers that are leveraged to move item containers to a destination location of the conveyer assembly. After moving the item containers, the plurality of container carriers (e.g., now emptied) may be routed back to a carrier recirculation system to receive another item container to repeat the process. This end-to-end conveyance process may be performed without removing a container carrier from the conveyer assembly.

For example, each container carrier of the closed system conveyer assembly may be ultimately routed to an overflow recirculation system. An overflow recirculation system may continuously move the container carriers until they are needed to move item containers. An overflow recirculation system may then supply one or more loading recirculation systems with a plurality of container carriers. In a high throughput system, this may be a continuous process in which container carriers are continuously moved from an overflow recirculation system to loading recirculation system. In some examples, an overflow recirculation system may receive container carriers back from the loading recirculation system in the event that they are not loaded after a recirculation cycle.

In some embodiments, the term "continuously travel" refers to an at least partially uninterrupted movement of an object. In some examples, a conveyer may be configured to operate continuously regardless of whether objects on the conveyer are continuously in motion. For example, a belt or a roller on a conveyer may operate continuously even if one or more objects are stationary or temporarily stationary (e.g., the belt or roller may slip underneath the one or more objects without moving them). In such examples, the conveyer may continuously deliver objects to be moved off of the conveyer.

In some embodiments, the term "container availability" refers to an availability of one or more containers for loading into one or more container carriers. For example, a container may be available if the container is present at a location (e.g., within an induction system, within a loading area, within a container recirculation system, etc.). In some examples, container carriers may be moved into a recirculation system based on container availability.

In some embodiments, the term "linking an identifier" refers to associating an identifier (e.g., an identifier data object) with one or more other data objects. For example, an identifier for a container carrier may be virtually linked with an identifier for an item container to virtually associate an item container with a container carrier. In this manner, an item container and container carrier may be jointly tracked as they traverse the fulfillment system.

In some embodiments, the term "item container information" refers to information or data that is associated with an item container. The item container information may indicate one or more characteristics or parameters for an item container, such as an identifier for an item container (e.g., an item container identifier), a location of an item container (e.g., an item container location), whether or not the item container is loaded into a container carrier (e.g., an item container loading status), and whether or not an error associated with the item container has occurred (e.g., an item container error status). The item container information may be stored by a computing entity or a controller for the fulfillment system. In some examples, the item container information may be an example of a data object.

In some embodiments, the term "item container identifier" refers to a string of one or more characters that correspond to an item container. The string of one or more characters may include one or more numbers, one or more letters, or any combination thereof. In some examples, an item container identifier may be assigned to an item container when the item container is introduced into a fulfillment system (e.g., during a first phase of a fulfillment process). In some examples, an item container identifier may be stored by a computing entity. In some examples, an item container identifier may be stored by a radio-frequency identification (RFID) tag (e.g., an RFID tag of a container carrier that carries the item container).

In some embodiments, the term "item container location" refers to a position of an item container within a fulfillment system. An item container location may be a current location of an item container or a last known location of an item container. For example, a sensing system may detect the presence of an item container at a specific location (e.g., at a location of the sensing system) and an item container location data object may be updated to indicate that the item container is or was located at the specific location.

In some embodiments, the term "container loading status" refers to a data entity that identifies whether a container carrier is loaded into an item container. In some examples, a binary value may be used to indicate a container loading status. For example, a first value (e.g., "1") may identify that an item container has been loaded into a container carrier and a second value (e.g., "0") may indicate that an item container has not been loaded into a container carrier.

In some embodiments, the term "container error status" refers to a container loading status that identifies an error or fault associated with an item container. For example, a container error status may be indicated by a bit. A first value of the bit (e.g., "1") may indicate that an error has occurred and a second value of the bit (e.g., "0") may indicate that an error has not occurred. In some other examples, one or more values (e.g., a string of values) may be used to indicate a container error status. In some examples, a container error status may additionally indicate a type of error that has occurred.

In some embodiments, the term "container carrier information" refers to information or data that is associated with a container carrier. The container carrier information may indicate one or more characteristics or parameters for a container carrier, such as an identifier for a container carrier (e.g., a container carrier identifier), a location of a container carrier (e.g., a container carrier location), whether or not the container carrier is carrying an item container (e.g., a carrier loading status), and whether or not an error associated with the container carrier has occurred (e.g., a container carrier error status). The container carrier information may be stored by a computing entity or a controller for the fulfillment system. In some examples, the container carrier information may be an example of a data object.

In some embodiments, the term "container carrier identifier" refers to a string of one or more characters that correspond to a container carrier. The string of one or more characters may include one or more numbers, one or more letters, or any combination thereof. In some examples, a container carrier identifier may be assigned to a container carrier when the container carrier is introduced into a fulfillment system (e.g., during a first phase of a fulfillment process). In some examples, a container carrier identifier may be stored by a computing entity. In some examples, a container carrier identifier may be stored by an RFID tag (e.g., an RFID tag of a container carrier).

In some embodiments, the term "sorting system" refers to a component of a fulfillment system. A sorting system may automatically route carrier container pairs to one or more other components of the fulfillment system, such as one or more container-filling systems in which item containers may be filled with a respective plurality of items. For example, a sorting system may move a carrier container pair to a manual filling area (e.g., to be filled manually) and/or to an automatic filling system (e.g., to be filled using automation). A sorting system may determine where to move a carrier container pair based on a type of order that the carrier container pair is associated with. For example, some types of orders (e.g., some medication types) may be designated for manual filling and other types of orders may be designated for automatic filling. Additionally, or alternatively, a sorting system may determine where to move a carrier container pair based on availability for a filling system. In some examples, a sorting system may receive one or more control signals (e.g., from a control system), which may control the sorting system. A sorting system may have one or more openings for objects to enter or exit through. For example, carrier container pairs may be moved into a sorting system via an entry point and out of the sorting system via an exit point. A sorting system may be coupled with one or more other components of a fulfillment system, such as one or more portions of the conveyer assembly to facilitate the movement of the carrier container pairs.

In some embodiments, the term "container filling system" refers to a component of a fulfillment system. A container filling system may include one or more mechanical and/or electrical components for automatically dispersing a plurality of items into an item container. A container filling system, for example, may include a hopper for holding a plurality of specific items, a counting chamber for counting a subset of the specific items, and/or a dispensing point through which the subset of the specific items may be dispersed from the container filling system. In some examples, a container filling system may include circuitry (e.g., cameras, sensors, memory, processors, etc.) specially configured to count a specific number of items as they fall through the counting chamber. In this way, a container filling system may dispense a specific number of items into an item container based on the order information corresponding to the item container.

In some embodiments, the term "sensing system" refers to a component of a fulfillment system. A sensing system may include circuitry (e.g., cameras, sensors, memory, processors, etc.) specially configured to detect, sense, and/or the like a presence of an object, such as item container, container carrier, and/or carrier container pair, at a particular location of the fulfillment system (e.g., a portion of the conveyer assembly). In some examples, a sensing system may be configured to detect an object by scanning information associated with the object as the object moves relative to (e.g., over, etc.) a scanning location on a conveyer assembly. For example, a sensing system include an RFID reader configured to receive one or more radio signals emitted by an object and/or a tracking mechanism thereof). By way of example, an object, such as a container carrier, may include one or more tracking mechanisms, such as an RFID tag, barcode, and/or the like. The tracking mechanism may emit an identifying radio signal that may be received by a sensing system when the object is within a proximity to the sensing system. A sensing system may be coupled with one or more components of a fulfillment system, such as one or more portions of the conveyer assembly to detect an object as it moves between or through portions of the conveyer assembly.

In some embodiments, the term "delivery system" refers to a component of a fulfillment system. A delivery system may be a destination location for an item container. At a delivery system, an item container may be manually and/or automatically loaded to a delivery package with one or more associated item containers. For instance, at a delivery system, an item container may be unloaded from a container carrier and placed within a delivery package for dispatching to an end user. A delivery system may be coupled with one or more other components of a fulfillment system, such as one or more portions of the conveyer assembly.

In some embodiments, the term "couple" refers to connecting one or more components. Coupling one or more components (e.g., one or more components of the fulfillment system) may include mechanically (e.g., physically) coupling the one or more components, electrically coupling the one or more components, or both. For example, a conveyer may be coupled with an induction system (e.g., a physical connection may exist between the conveyer and the induction system). A coupling may enable a container carrier to be delivered from one component of a fulfillment system to another component of the fulfillment system. Additionally, or alternatively, a coupling may enable signaling or communications to be communicated from one component of a fulfillment system to another component of the fulfillment system.

In some embodiments, the term "error" refers to a failure or a fault that is detected. For example, an error may indicate that an item container has not been successfully loaded into a container carrier. Some other examples of errors may indicate that a component has lost power, that an item container has been incorrectly loaded into a container carrier, or a tracking mechanism has not been correctly read, among other examples. An error (e.g., a message indicating the occurrence of an error) may be communicated to one or more components of a fulfillment system. In some examples, an object may be moved to one or more components of the fulfillment system based on the occurrence of an error.

IV. OVERVIEW

Various types of fulfillment systems, such as those used for the fulfillment of pharmaceutical orders, may be utilized for packaging and delivering orders to customers. Such fulfillment systems may leverage various conveyer assemblies to transport objects, such as pill capsules in a pharmaceutical fulfillment system, between different locations within the fulfillment system. Such fulfillment systems may additionally utilize packaging systems, labeling systems, sensor systems, control systems, and tracking systems, among other examples, in a closed-loop distribution process in which an object is moved from storage location to a package for dispatch to an end user.

In some cases, a fulfillment system may transport items that are too small to individually track and move in a reliable manner. For instance, in a pharmaceutical fulfillment system, pill capsules may be moved from one location to another. In such cases, the small items may be grouped into item containers, such as pill vials in a pharmaceutical use case, before dispatch to an end user. At times, item containers may lack trackability within a fulfillment system or lack stability due to their shape, structure, and/or the like. To address these disadvantages without replacing traditional item containers, the item container may be paired with container carriers, such as circular pucks for pill vials, that improve the stability and trackability of the item containers as the item containers are transported across the fulfillment system. For example, an item container may be loaded into a container carrier and then transported in the container carrier to a filling system where the item container is filled with one or more items (e.g., pill capsules, etc.).

In some examples, systems utilized for conveyance and for loading item containers into container carriers may present challenges. For examples, some fulfillment systems may utilize electronically controlled gates for moving container carriers and item containers into a loading system (e.g., an induction system that loads item containers into container carriers, labels the item containers, etc.). However, the associated control logic and maintenance associated with such systems may increase complexity and operational costs. Additionally, cycle time may be increased as a result of container carriers and item containers being temporarily stopped when such gates are closed.

In accordance with one or more examples as described herein, a fulfillment system may be equipped with one or more components that decrease cycle time, reduce operational costs, and otherwise improve sorting and tracking of orders. For example, a fulfillment system may include one or more continuous flow systems, which may enable the continuous circulation and routing (e.g., movement) of item containers and container carriers. Such continuous flow systems may enable the elimination of one or more electronically controlled gates, which may reduce system complexity, reduce maintenance costs, reduce cycle time, and conserve processing resources associated with controlling the one or more gates. Additionally, or alternatively, continuous flow systems may enable continuous operation of one or more conveyers at a fixed speed, which may improve energy efficiency when compared to other systems that regularly start and stop.

In some examples, continuous flow systems may be utilized to automatically move item containers and container carriers into an induction system (e.g., for loading item containers into container carriers). For example, the continuous flow system may include one or more conveyers that continuously circulate and queue container carriers in a loading position relative to (e.g., beneath, etc.) an induction system. The continuous circulation may cause a portion of available container carriers to accumulate at an egress point or opening of the induction system. The induction system may have an ingress point or opening, which may be coupled with a second continuous flow system for loading item containers into the induction system in the same fashion that container carriers are positioned at the loading position relative to the induction system. By doing so, item containers may be automatically loaded into container carriers in a seamless process without the use of control gates or other control logic.

V. EXAMPLE SYSTEM FRAMEWORKS AND PROCESS FLOWS

As indicated, various embodiments of the present disclosure make important technical contributions to fulfillment system technologies. In particular, systems and methods are disclosed herein that continuously circulate and queue item containers and container carriers in a manner that increases throughput, decreases cycle time, and improves operational efficiency.

Figure 4:
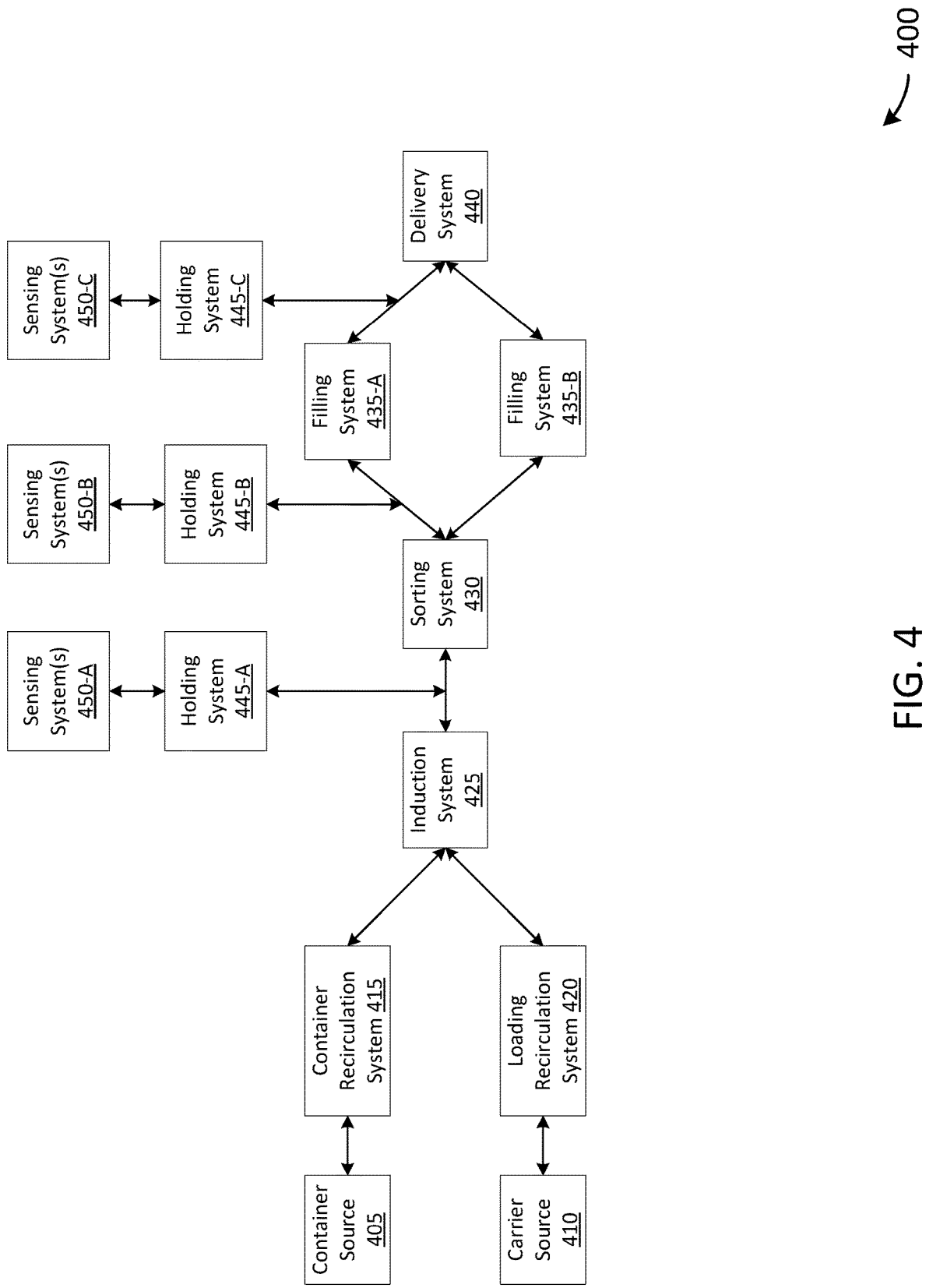
FIG. 4 provides an example fulfillment system in accordance with one or more embodiments of the present disclosure.

FIG. 4 provides an example fulfillment system 400 in accordance with some embodiments discussed herein. The fulfillment system 400 may be an example of one or more aspects of the system 100. Although the example fulfillment system 400 depicts a particular arrangement of components, the arrangement may be altered without departing from the scope of the present disclosure. For example, some components of the fulfillment system 400 may be omitted and other components that are not shown may be added to the fulfillment system 400. As an illustrative example, one or more components of the fulfillment system 400 may be controlled by a data analysis system 101, a computing entity (e.g., a computing entity 106, an external computing entity 102), or any other type of controller or processor not shown in FIG. 4. Additionally, various components of the fulfillment system 400 may be arranged in a different order than the order shown.

The fulfillment system 400 may include one or more components, which may be physically coupled, electronically coupled (e.g., in communication with one another), or both. For example, the container source 405 may be physically coupled with one or more recirculation systems, such as a container recirculation system 415 by a portion of a conveyance assembly. Accordingly, the conveyer assembly (e.g., portion thereof) may transport one or more item containers between the container source 405 and the container recirculation system 415. Additionally, or alternatively, various components of the fulfillment system 400 may be communicatively coupled with one another or with one or more other components (not shown), such as a computing entity 106.

In some embodiments, the fulfillment system 400 is a system for handling orders for items. The fulfillment system 400, for example, may include a plurality of logistic components for a distribution center in which items are moved, processed, and grouped in one or more packages to fulfill an order. In this respect, the logistic components may be strategically placed within the distribution center to optimize a throughput, or other logistic considerations, of the fulfillment system 400. Logistic components, for example, may include conveyer assemblies, packaging areas, item processing areas, and/or the like that are configured to efficiently and reliably transition an item from a storage location to an end user. By way of example, a fulfillment system 400 may include a pharmaceutical fulfillment system configured to move pharmaceutical items, such as pill vials, and/or the like, from a storage location to a package that may dispatched to an end user. A pharmaceutical fulfillment system may include various logistic components, such as conveyer assemblies, induction systems 425, sorting systems 430, filling systems 435 (e.g., vial-filling systems), and/or the like that are collectively configured to fill a pill vial and then transport the filled vial to a package in accordance with an order for one or more medications.

In some embodiments, an order is a data entity that describes one or more items for an end user (e.g., an individual person, an organization, such as a pharmacy, etc.). In some examples, an order may be associated with a plurality of items that may originate at one or more different locations within the fulfillment system 400. To fulfill an order, the fulfillment system 400 may group the plurality of items into a common package for dispatch to the end user.

As an example, an order for a pharmaceutical fulfillment system may describe one or more different medications for an end user. In some examples, to originate an item for the order, a plurality of medications, such as pill capsules, may be loaded into one or more vials or other containers. Accordingly, an order may be associated with a plurality of vials, or other containers that each contain a portion of the order (e.g., one of the one or more different medications). To fulfill an order, the pharmaceutical fulfillment system may group the plurality of vials into a common package for dispatch to the end user.

In some embodiments, an end user refers to an originator of an order. An entity may be an individual (e.g., patient, customer, etc.), a business (e.g., pharmacy, clinic, etc.), and/or the like. An end user may be associated with a physical location to which a plurality of different item containers may be delivered to fulfill an order. The item containers may be filled and transported to a delivery location (e.g., a delivery system 440) using a conveyer assembly of the fulfillment system 400.

In some embodiments, a conveyer assembly is a component of the fulfillment system 400 that is configured to move (e.g., through friction or other forces) item containers, container carriers, and/or the like to, from, and/or between one or more locations within the fulfillment system 400. In some examples, a conveyer assembly may include an assembly, arrangement, system, and/or the like that includes a plurality of conveyers. In some examples, a conveyer assembly may include an end-to-end closed conveyance system that is configured to transport (e.g., move, route, etc.) a plurality of objects (e.g., item containers, container carriers, combinations thereof, etc.) between one or more points within a fulfillment system 400. The conveyer assembly may include a plurality of at least partially connected portions, each configured to move a plurality of objects (e.g., item containers, container carriers, combinations thereof, etc.) to, from, and/or between multiple points within the fulfillment system 400. In some examples, one or more portions of the conveyer assembly may be connected by one or more other systems, such as an induction system 425 as described herein.

In some embodiments, a conveyer assembly includes a plurality of portions that respectively correspond to one or more areas within a fulfillment system 400. For instance, each portion may include one or more conveyers that are configured to move an object, directly or indirectly, from an origin location to a destination location associated with a respective area. To do so, each of the one or more portions of the conveyer assembly may include one or more recirculation and/or direct conveyer systems.

As described herein, a recirculation conveyer system (e.g., a container recirculation system 415, a loading recirculation system 420) may include an at least partially looped conveyer in which an object may complete one or more recirculation cycles without moving from a portion of the conveyer assembly. A direct conveyer system may include a directed section of conveyer that moves an object from an origin to a destination location. An object may be moved between portions of the conveyer assembly using the direct conveyer systems. For example, a direct conveyer system may include an induction exiting system configured to move an item container, a container carrier, and/or one or more combinations thereof from an induction system 425 to a subsequent portion of a conveyer assembly (e.g., a sorting system 430).

Various embodiments described herein provide a conveyer assembly that provides advantages when compared to conventional conveyer systems. For example, the conveyer assembly may be configured to facilitate more efficient, effective, and accurate processing of connected orders, such as pharmaceutical orders, in which a plurality of small objects are aggregated, transported, and collectively packaged for a single end user. For example, the conveyer assembly described herein may include one or more components that decrease cycle time, reduce operational costs, and otherwise improve sorting and tracking of orders. To do so, the conveyer assembly may include one or more continuous flow systems (e.g., recirculation systems) that enable the continuous circulation and routing of compatible objects (e.g., item containers, container carriers, etc.). By maintaining a continuous movement of the objects, the conveyer assembly may leverage forces exerted by the object themselves to replace traditional electronically controlled gates with mechanical routing mechanisms, which reduces system complexity, maintenance costs, and cycle time, while conserving processing resources, and improving overall system throughput as well as energy efficiency.

In some embodiments, a conveyer is a component of the conveyer assembly. A conveyer may include one or more moving surfaces (e.g., one or more belts, one or more rollers, etc.), which may exert one or more directional forces on one or more objects placed on the conveyer. In some examples, a conveyer may be controlled by a control system. It should be understood that a conveyer or conveyer belt, as described herein, may be configured as a conventional conveyer belt, such that it is formed and/or extended around at least two driving wheels. By turning the driving wheels, the conveyer belt may run cyclically (e.g., continuously around the driving wheels). The conveyer belt may thus, like conventional belts of this nature, be made from a multitude of materials, linkages, and so forth, so as to achieve the desired combination of durability and flexibility thereof.

In some embodiments, an item container is a physical object with an interior portion defined by a plurality of exterior walls that is designed to contain one or more items. An item container, for example, may include a package, tote, box, tube, and/or the like for containing a plurality of items in a common space. In some examples, an item container may define a closed interior portion to contain the plurality of items in a closed environment.

As an example, in a pharmaceutical fulfillment system, an item container may include a vial, such as a pill vial for holding a plurality of pill capsules. A vial, for example, may include a cylindrical container with curved sidewalls, a floor, and a removeable cap disposed opposite to the floor that define an interior portion of the vial. As described herein, the interior portion of the vial may be at least partially filled with a plurality of items, such as pill capsules, to group and then collectively move the plurality of items across the pharmaceutical fulfillment system.

In some examples, an item container, such as a pill vial, may include a small item that may be unstable (e.g., subject to falling, rolling, etc.) and/or difficult to track across a fulfillment system. In accordance with some embodiments of the present disclosure, to improve the stability and/or trackability of an item container as it is moved across the fulfillment system, an item container may be temporarily placed at least partially within an interior portion of another, larger object. For instance, an item container may be placed within a container carrier.

The fulfillment system 400 may include one or more container sources 405. A container source 405 may be an example of an area or a component that introduces item containers to the fulfillment system 400. In some examples, a container source 405 may refer to a region of the fulfillment system 400 where item containers are loaded onto one or more conveyers. A container source 405 may be coupled with one or more other subcomponents of a fulfillment system 400, such as a container recirculation system 415. In some examples, the container source 405 may be coupled with the container recirculation system 415 via one or more conveyers.

The fulfillment system 400 may include one or more carrier sources 410. A carrier source 410 may be an example of an area or a component that introduces container carriers into the fulfillment system 400. In some examples, a carrier source 410 may refer to a region of a fulfillment system 400, such as an overflow recirculation system, where container carriers are recirculated, stored, and/or otherwise sourced to one or more other portions of a closed conveyance system. For example, an item container may be unloaded from a container carrier (e.g., for delivering to a customer), and the container carrier may be conveyed to the carrier source 410. The carrier source 410 may accumulate container carriers and convey the container carriers into a loading recirculation system 420 (e.g., for delivery to an induction system 425). Accordingly, container carriers may be recycled or otherwise reused once item containers have been delivered.

In some embodiments, a container carrier is a physical object with an interior portion defined by one or more of interior walls and an exterior portion defined by one or more of exterior walls. A container carrier, for example, may include an interior portion that is compatible with an item container. For example, a diameter, length, and/or the like of the interior portion may be based on a diameter, length, and/or the like of an item container such that the item container may be placed within the interior portion. In addition, or alternatively, the container carrier may include an exterior portion that is larger than the item container to add stability to the item container as it traverses a fulfillment system 400. A container carrier, for example, may be used to hold, support, and/or the like one or more item containers.

By way of example, a container carrier may be an example of a puck (e.g., a transportation puck) that is compatible with a vial. A transportation puck may include cylindrical exterior and/or interior portions. For instance, the transportation puck may be cylindrical and may include a cylindrical cavity (e.g., the interior portion) where a vial may be placed. In this respect, a diameter of the interior portion may be based on a diameter of a vial. In some other examples, a transportation puck may include a plurality of cylindrical cavities, where each cylindrical cavity may hold a respective vial. Although some pucks may be cylindrical, other puck geometries may be utilized. For example, a puck may be rectangular or square.

In some embodiments, a container carrier includes one or more tracking mechanisms for identifying a location of the container carrier (and/or an item container, a plurality of items therein, etc.) within the fulfillment system 400. The one or more tracking mechanisms, for example, may include one or more radio-frequency identification (RFID) tags, barcodes, and/or the like.

In some embodiments, a carrier container pair is a container carrier with an item container placed at least partially therein. A carrier container pair may be transported across the fulfillment system 400 to move and track an item container (and/or a plurality of items therein). In some examples, a carrier container pair may be originated by an induction system 425 that is configured to place an item container at least partially within a container carrier.

To facilitate the continuous pairing (e.g., marriage) of item containers with respective container carriers, the fulfillment system 400 may include one or more recirculation systems that are configured to provide a continuous supply of item containers and container carriers to a plurality of induction systems 425. For example, the fulfillment system 400 may include one or more container recirculation systems 415 for recirculating item containers and/or one or more carrier recirculation systems (e.g., overflow recirculation systems, loading recirculation systems 420) for recirculating container carriers with respect to one or more induction systems 425.

In some embodiments, a recirculation system is a configuration of conveyers within a conveyer assembly that transport, convey, etc. an object along a looped (e.g., continuous) path. Stated another way, a recirculation system may transport an object from an origin location to one or more other points and then back to the origin location. An object in a recirculation system may follow a circular path or an irregular, non-circular path. To do so, a recirculation system may have one of one or more different configurations. A first configuration may include a plurality of conveyers placed at one or more angles to collectively form a looped path. In addition, or alternatively, a second configuration may include two sets of conveyers that move in opposite directions. For instance, the second configuration may include a first set of linear conveyers and a second set of linear conveyers that may apply opposite directional forces to objects disposed on a surface of the respective sets of linear conveyers. The first set of conveyers may be adjacent to the second set of conveyers such that an object may be moved (e.g., by a making contact with a partition, by one or more looped conveyers, etc.) from the first set of conveyers to the second set of conveyers. The first set of conveyers may be configured to transport objects in a first direction and the second set of conveyers may be configured to transport objects in a second direction parallel to and opposite of the second direction to form a continuous loop with the first set of conveyers.

In one illustrative example of the second configuration, an object may travel on the first set of conveyers in the first direction until the object is slid or is pushed (e.g., by another object, by a partitioning wall, by one or more looped conveyers, etc.) onto the second set of conveyers. The second set of conveyers may then move the object in the second, opposite direction. In such examples, the object may be said to recirculate by way of switching from the first set of conveyers to the second set of conveyers and reversing direction. In some examples, the object may recirculate or otherwise switch between conveyers continuously until the object is moved from both sets of conveyers.

In some embodiments, a recirculation system includes one or more entry and/or exit points. For example, an object may be moved to a recirculation system (e.g., onto a conveyer surface of the recirculation system, etc.) via an entry point and may be moved from the recirculation system via an exit point. An entry point, for example, may include a gate (e.g., a mechanical gate, an electronic gate, etc.), a partitioning wall, and/or the like that may be controlled and/or configured to direct an object to a recirculation system. An exit point may include a gate (e.g., a mechanical gate, an electronic gate, etc.), a partitioning wall, and/or the like that may be controlled and/or configured to direct an object from a recirculation system.

A conveyer assembly may include a plurality of recirculation systems of different types to continuously move objects within one or more portions of the conveyer assembly. For instance, the recirculation systems may include one or more carrier recirculation systems, one or more container recirculation systems 415, one or more holding systems 445-A-C, and/or the like. Each of the recirculation systems may include entry and/or exit points that are configured for a particular task. By way of example, a recirculation system, such as a loading recirculation system 420, and/or a container recirculation system 415 may include a plurality of exit points that are respectively associated with partitioning assemblies configured to leverage a continuous motion of objects (e.g., possible by the cyclic design of the recirculation systems) within the recirculation systems to automatically position the objects with respect to an induction system 425 as the objects exit the recirculation systems.

By way of example, a partitioning assembly may cause an object to be moved from the recirculation system based on a position of the object relative to a width and/or sidewall of the recirculation system. For example, a partitioning assembly may be configured to intercept and route an object located on a portion of a conveyer of a recirculation system (e.g., located along a sidewall of the conveyer or within a certain distance from the sidewall of the conveyer) from the recirculation system (e.g., to a position relative to an induction system 425, etc.).

In some embodiments, a recirculation cycle refers to a movement of an object from an origin location back to the origin location. A recirculation cycle may be completed as an object is moved by an at least partially circular set of conveyers. In addition, or alternatively, a recirculation cycle may be completed by changing a direction of motion of an object by transferring the object between two conveyers operating in opposite directions. By way of example, a recirculation cycle may include one or more changes in a conveyance direction of an object in a recirculation system. For instance, a recirculation cycle may be associated with or correspond to an object moving from a first conveyer (e.g., conveying the object in a first direction) to a second conveyer (e.g., conveying the object in a second direction). An object may complete a recirculation cycle if the object changes direction one or more times to move from an origin location back to the origin location.

In some embodiments, the fulfillment system 400 includes one or more recirculation systems configured to continuously feed a plurality of induction systems 425. The induction systems 425 may be configured to create carrier container pairs by placing item containers fed in by one recirculation system at least partially within container carriers fed in by another recirculation system.

In some embodiments, an induction system 425 is a component of a fulfillment system 400 that is configured to label and then place an item container within a container carrier. An induction system 425, for example, may include an item container labeler, such as a vial labeler, that is configured to adhere a label to an item container that describes one or more contents (e.g., a plurality of items) within and/or assigned to the item container. By way of example, an induction system 425 may receive an empty item container, print a label for the item container, apply the label to the item container, and then drop the item container into a container carrier for transportation to a location for filling the item container with one or more items described by the item label.

An induction system 425 may include one or more openings for objects to enter and/or exit an interior chamber of the induction system 425 (e.g., a labeling chamber, etc.). The one or more openings, for example, may include an ingress point and an egress point. In some examples, an item container may enter the induction system 425 through an ingress point and exit through the egress point. In some embodiments, an ingress point is located at a top portion of an induction system 425 and an egress point is located at a bottom portion of the induction system 425. An item container may enter the interior chamber of the induction system 425 by dropping through the ingress point. In some examples, an item container may be prevented from dropping through the ingress point in the event that another item container is located within the interior chamber. For instance, a currently loaded item container may act as a barrier to the entrance of a subsequent item container. The subsequent item container may drop (e.g., based on a gravitational force, etc.) into the interior chamber as the currently loaded item container exits the interior chamber. In this manner, the interior chamber of an induction system 425 may continuously cycle through a plurality of item containers.

In some examples, an item container may be held (e.g., using a mechanical arm, gate, trap door, etc.) within an induction system 425 to apply a label to the item container. Once the label is applied, the item container may be dropped through the egress point to exit the induction system 425 and allow the entrance of a subsequent item container.

In some examples, a container carrier may be positioned at a loading position relative to the induction system 425 to receive an item container as the item container exits the induction system 425. By way of example, the loading position may be located below an egress point of the induction system 425 such that an item container may be placed (e.g., dropped, loaded, etc.) within an interior portion of a container carrier as the item container exits the induction system 425.

In some embodiments, an induction system 425 is coupled with one or more other components of a fulfillment system 400 to facilitate a continuous movement of a plurality of item containers and container carriers relative to the induction system 425. The one or more other components, for example, may include one or more partitioning assemblies and/or conveyer systems collectively configured to move an item container to an ingress point and a container carrier to an egress point of an induction system 425. For example, an item container and/or container carrier may be continuously moved by a conveyer system and directed to an ingress and egress point of an induction system 425 by a partitioning assembly. For example, a partitioning assembly (and/or one or more partitioning walls thereof) may cause a formation of a queue of item containers adjacent to an ingress point of an induction system 425. As additional item containers are directed into the queue, one or more item containers in the queue may be pushed into the induction system 425 (e.g., by another item container, the conveyer, or both).

In some embodiments, a container recirculation system 415 refers to a recirculation system that is designed to recirculate item containers at one or more portions of the conveyer assembly. As described herein, a container recirculation system 415 may be configured to recirculate a plurality of item containers such that they complete one or more container recirculation cycles. In some examples, a container recirculation system 415 may include one or more partitioning assemblies that may direct one or more of a plurality of recirculating item containers into one or more loading areas. By doing so, a container recirculation system 415 may cause a continuous movement of item containers to automatically and continuously feed item containers into one or more induction systems 425.

In some embodiments, a carrier recirculation system is a recirculation system that is designed to recirculate container carriers at one or more portions of the conveyer assembly. As described herein, a carrier recirculation system may be configured to recirculate a plurality of container carriers such that they complete one or more carrier recirculation cycles. By doing so, a carrier recirculation system may cause a continuous movement of container carriers to automatically and continuously feed the container carriers into loading positions relative to the one or more induction systems 425.

In some embodiments, a loading recirculation system 420 is a type of a carrier recirculation system. A loading recirculation system 420 may be configured to continuously move container carriers as they are moved into loading positions relative to one or more induction systems 425. For example, a loading recirculation system 420 may include one or more partitioning assemblies that may direct one or more of a plurality of recirculating container carriers into one or more loading areas.

In some examples, a loading recirculation system 420 may exchange container carriers with another carrier recirculation system to complete a carrier recirculation cycle. For instance, a loading recirculation system 420 may receive container carrier from one or more other components of a fulfillment system 400, such as a carrier source 410, which may be another example of a recirculation system. In some examples, a loading recirculation system 420 may receive a plurality of container carriers from an overflow recirculation system. Additionally, or alternatively, the loading recirculation system 420 may move one or more container carriers into the overflow recirculation system (e.g., if the one or more container carriers are not loaded into an induction system 425 during a recirculation cycle).

In some embodiments, the overflow recirculation system is a type of carrier recirculation system. In some examples, an overflow recirculation system may be configured to recirculate a plurality of container carriers received from one or more different portions of a conveyer assembly. For instance, the conveyer assembly may form a closed system with a plurality of container carriers that are leveraged to move item containers to a destination location of the conveyer assembly. After moving the item containers, the plurality of container carriers (e.g., now emptied) may be routed back to a carrier recirculation system to receive another item container to repeat the process. This end-to-end conveyance process may be performed without removing a container carrier from the conveyer assembly.

For example, each container carrier of the closed system conveyer assembly may be ultimately routed to an overflow recirculation system. An overflow recirculation system may continuously move the container carriers until they are needed to move item containers. An overflow recirculation system may then supply one or more loading recirculation systems 420 with a plurality of container carriers. In a high throughput system, this may be a continuous process in which container carriers are continuously moved from an overflow recirculation system to a loading recirculation system 420. In some examples, an overflow recirculation system may receive container carriers back from the loading recirculation system 420 in the event that they are not loaded after a recirculation cycle.

The fulfillment system 400 may include one or more sorting systems 430. In some embodiments, the sorting system 430 refers to a component of a fulfillment system 400. A sorting system 430 may automatically route carrier container pairs to one or more other components of the fulfillment system 400, such as one or more filling systems 435A-B in which item containers may be filled with a respective plurality of items. For example, a sorting system 430 may move a carrier container pair to a manual filling area (e.g., to be filled manually) and/or to an automatic filling system (e.g., to be filled using automation). A sorting system 430 may determine where to move a carrier container pair based on a type of order that the carrier container pair is associated with. For example, some types of orders (e.g., some medication types) may be designated for manual filling and other types of orders may be designated for automatic filling. Additionally, or alternatively, a sorting system 430 may determine where to move a carrier container pair based on availability of a filling system 435A-B. In some examples, a sorting system 430 may receive one or more control signals (e.g., from a control system), which may control the sorting system 430. A sorting system 430 may have one or more openings for objects to enter or exit through. For example, carrier container pairs may be moved into a sorting system 430 via an entry point and out of the sorting system 430 via an exit point. A sorting system 430 may be coupled with one or more other components of a fulfillment system 400, such as one or more portions of the conveyer assembly to facilitate the movement of the carrier container pairs.

The fulfillment system 400 may include one or more container filling systems 435A-B. In some embodiments, a container filling system 435A-B refers to a component of a fulfillment system 400. A container filling system 435A-B may include one or more mechanical and/or electrical components for automatically dispersing a plurality of items into an item container. A container filling system 435A-B, for example, may include a hopper for holding a plurality of specific items, a counting chamber for counting a subset of the specific items, and/or a dispensing point through which the subset of the specific items may be dispersed from the container filling system 435A-B. In some examples, a container filling system 435A-B may include circuitry (e.g., cameras, sensors, memory, processors, etc.) configured to count a specific number of items as they fall through the counting chamber. In this way, a container filling system 435A-B may dispense a specific number of items into an item container based on the order information corresponding to the item container. In some examples, the filling system 435-A may be an example of an automatic filling system and the filling system 435-B may be an example of a manual filling system, or vice versa.

The fulfillment system 400 may include one or more sensing systems 450A-C. In some embodiments, a sensing system 450A-C refers to a component of a fulfillment system 400. A sensing system 450A-C may include circuitry (e.g., cameras, sensors, memory, processors, etc.) configured to detect, sense, and/or the like a presence of an object, such as item container, container carrier, and/or carrier container pair, at a particular location of the fulfillment system 400 (e.g., a portion of the conveyer assembly). In some examples, a sensing system 450A-C may be configured to detect an object by scanning information associated with the object as the object moves relative to (e.g., over, etc.) a scanning location on a conveyer assembly. For example, a sensing system 450A-C may include an RFID reader configured to receive one or more radio signals emitted by an object and/or a tracking mechanism thereof. By way of example, an object, such as a container carrier, may include one or more tracking mechanisms, such as an RFID tag, barcode, and/or the like. The tracking mechanism may emit an identifying radio signal that may be received by a sensing system 450A-C when the object is within a proximity to the sensing system 450A-C. A sensing system 450A-C may be coupled with one or more components of a fulfillment system 400, such as one or more portions of the conveyer assembly to detect an object as it moves between or through portions of the conveyer assembly.

The fulfillment system 400 may include one or more delivery systems 440. In some embodiments, the delivery system 440 is a component of a fulfillment system 400. A delivery system 440 may be a destination location for an item container. At a delivery system 440, an item container may be manually and/or automatically loaded to a delivery package with one or more associated item containers (e.g., associated with a same order). For instance, at a delivery system 440, an item container may be unloaded from a container carrier and placed within a delivery package for dispatching to an end user. A delivery system 440 may be coupled with one or more other components of a fulfillment system 400, such as one or more portions of the conveyer assembly.

The fulfillment system 400 may include one or more holding systems 445A-C. In some examples, a carrier container pair may be moved from a first conveyer to a holding system 445A-C. The holding systems 445A-C may include one or more conveyers (e.g., recirculation systems, etc.), which may circulate the carrier container pairs (e.g., hold the carrier container pairs) for a duration. A holding system 445A-C may hold a plurality of carrier container pair simultaneously. A holding system 445A-C may have one or more openings for objects to enter or exit through. For example, carrier container pairs may be moved into a holding system 445A-C via an entry point and out of the holding system 445A-C via an exit point. A holding system 445A-C may be coupled, via one or more conveyers, with one or more other components of a fulfillment system.

Figure 5:
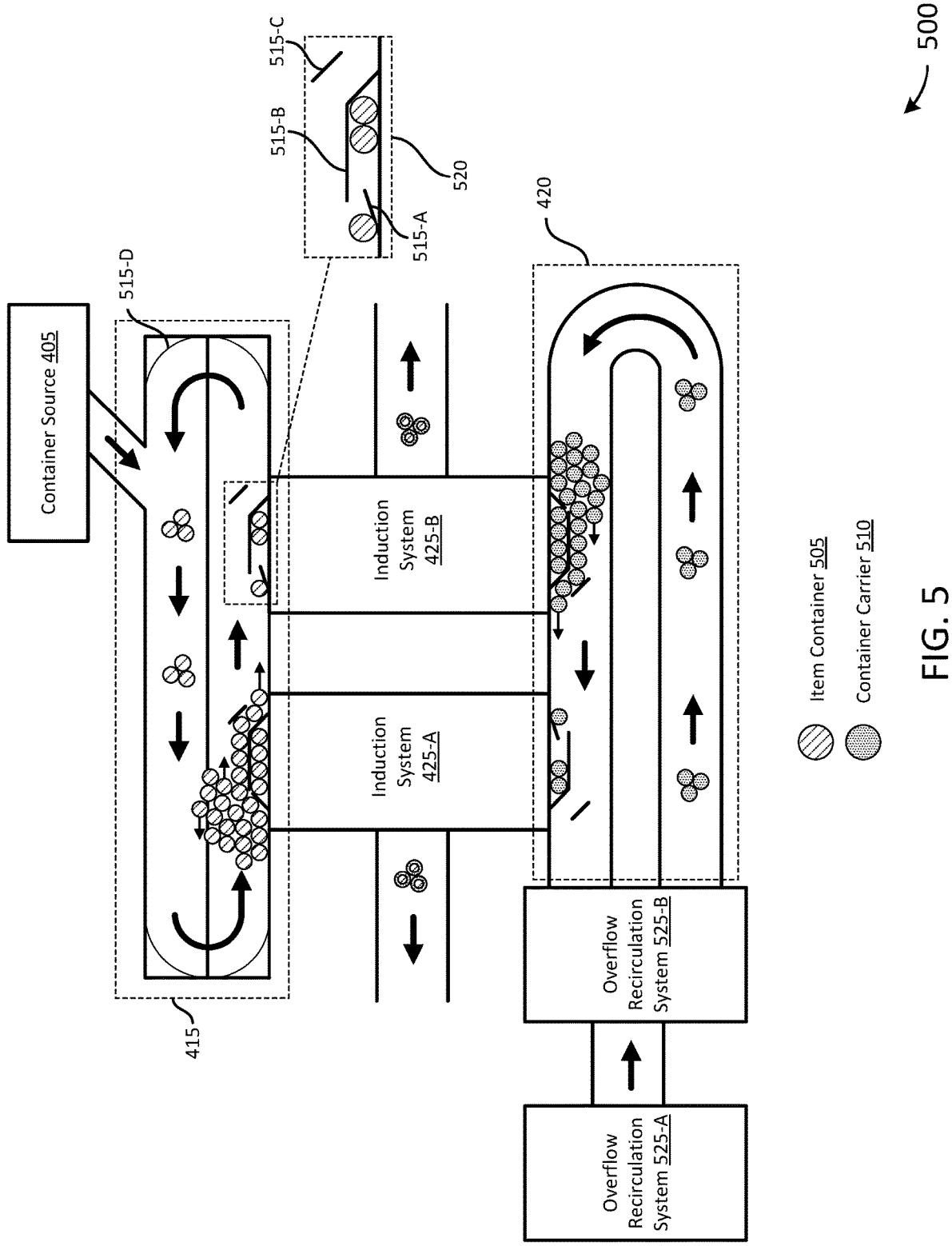
FIG. 5 provides an example continuous flow system in accordance with one or more embodiments of the present disclosure.

FIG. 5 provides an example continuous flow system 500 in accordance with some embodiments discussed herein. The continuous flow system 500 may be an example of one or more aspects of the continuous flow system 110, as described with reference to FIG. 1. Additionally, or alternatively, the continuous flow system 500 may include one or more aspects of the fulfillment system 400, as described with reference to FIG. 4. For example, the continuous flow system 500 may include one or more induction systems 425 and/or one or more recirculation systems, which may be examples of corresponding components described with reference to FIG. 4. In some examples, the one or more recirculation systems may include one or more types of recirculation systems. For example, the continuous flow system 500, may include one or more container recirculation systems 415, loading recirculation systems 420, and/or overflow recirculation systems 525A-B.

Although the example continuous flow system 500 depicts a particular arrangement of components (e.g., sub-components), the particular arrangement may be altered without departing from the scope of the present disclosure.

For example, some components of the continuous flow system 500 may be omitted and other components that are not shown may be added to the continuous flow system 500. As an illustrative example, one or more components of the continuous flow system 500 may be controlled by a data analysis system 101, a computing entity (e.g., a computing entity 106, an external computing entity 102), or any other type of controller or processor not shown in FIG. 5. Additionally, various components of the continuous flow system 500 may be arranged in a different order than the order shown.

The continuous flow system 500 may include a first portion of a conveyer assembly configured to move a plurality of container carriers 510 to one or more carrier recirculation systems (e.g., the loading recirculation system 420, the overflow recirculation system 525-A, the overflow recirculation system 525-B) that are configured to recirculate the plurality of container carriers 510 for one or more container carrier recirculation cycles. The continuous flow system 500 may include a second portion of the conveyer assembly configured to move a plurality of item containers 505 to a container recirculation system 415 that is configured to recirculate the plurality of item containers 505 for one or more item container recirculation cycles.

The continuous flow system 500 may include a partitioning assembly 520 (e.g., a container partitioning assembly) disposed relative to the container recirculation system 415 to direct a movement of an item container 505 of the plurality of item containers to one or more induction systems 425A-B. The continuous flow system 500 may include a partitioning assembly 520 (e.g., a carrier partitioning assembly) disposed relative to the one or more carrier recirculation systems to direct a movement of a container carrier 510 of the plurality of container carriers to a loading position relative to the one or more induction systems 425A-B. The continuous flow system 500 may include the one or more induction systems 425A-B configured to load the item container 505 into an interior portion of the container carrier 510. In some examples, the continuous flow system 500 may be an example of a conveyer assembly that includes one or more portions (e.g., one or more conveyer portions).

In some examples, one or more components of continuous flow system 500 may be physically coupled, electronically coupled (e.g., in communication with one another), or both. For example, the container recirculation system 415 may be physically coupled with the one or more induction systems 425A-B. Accordingly, the container recirculation system 415 may transport one or more item containers 505 into the one or more induction systems 425A-B (e.g., via one or more partitioning assemblies). Additionally, or alternatively, various components of the continuous flow system 500 may be communicatively coupled with one another or with one or more other components (not shown), such as a computing entity 106. For example, the induction system 425 may transmit and receive communications from a computing entity 106.

The continuous flow system 500 may include a plurality of item containers 505, which may be conveyed or otherwise transported by the container recirculation system 415 and by the container source 405. Additionally, or alternatively, the one or more induction systems 425 may convey the plurality of item containers 505 and move the plurality of item containers 505 onto one or more conveyers configured to transport the plurality of item containers 505 (e.g., carrier container pairs) away from the one or more induction systems 425 and towards one or more other components of a fulfillment system 400. As described herein, an item container 505 may be an example of a container that holds one or more items, such as medications, and/or the like. In some examples, an item container 505 may be loaded into a container carrier 510 (e.g., into an interior portion of a container carrier 510) to improve a stability and trackability of the item container 505 as the item container 505 is transported between one or more portions of a conveyer assembly—although an item container 505 may be conveyed in other examples without being loaded into a container carrier 510. The continuous flow system 500 may include a plurality of container carriers 510, which may be conveyed or otherwise transported by the loading recirculation system 420 and/or one or more overflow recirculation systems 525.

In some embodiments, the continuous flow system 500 includes one or more partitioning assemblies 520 that are leveraged to move container carriers 510 to one or more portions of a conveyer assembly. A partitioning assembly 520 may be an assembly or combination of two or more partitioning walls 515A-C utilized to route or otherwise move an object, such as an item container 505 or a container carrier 510. In some examples, the partitioning assemblies 520 may include partitioning walls 515A-C (e.g., barriers) that, when coming in contact with an object, redirects the object using a force of motion applied by a conveyer assembly.

In some embodiments, a partitioning wall 515A-C is a component of a fulfillment system that is used for routing or directing a movement of an object. In some examples, a partitioning wall 515A-C may be fixed (e.g., a partitioning wall 515A-C may not move or have any moving parts). In addition, or alternatively, a partitioning wall 515A-C may be movable (e.g., include a hinge, etc.). A partitioning wall 515A-C may be an example of a type of routing device, such as a mechanical routing device, which may be different from some other types of routing devices (e.g., electronically controlled routing devices). A partitioning wall 515A-C may route or otherwise direct an object, such as an item container and/or container carrier, from a first component of a fulfillment system (e.g., a recirculation system) to a second component of a fulfillment system (e.g., an induction system 425A-B).

In some examples, a partitioning wall 515A-C may direct an object as it is moved by a conveyer assembly. For example, a partitioning wall 515A-C may adjust or alter a path of an object as the object travels along a conveyer. In some examples, a partitioning wall 515A-C may route an object from one conveyer to another conveyer (e.g., from a first portion of a conveyer assembly to a second portion of a conveyer assembly). In some examples, two or more partitioning walls 515A-C may be utilized (e.g., in conjunction with one another) to route an object.

In some embodiments, the partitioning assembly 520 refers to one or more partitioning walls 515A-C utilized to route, redirect, and/or the like an object with respect to another component of a fulfillment system. In some examples, a partitioning assembly 520 may include one or more partitioning walls 515A-C that are located relative to one another to direct an object's direction of movement. A partitioning assembly 520, for example, may include one or more partitioning walls 515A-C relative to an induction system that are configured to direct an object to an ingress and/or egress point of the induction system 425A-B. A partitioning assembly 520, for example, may include a carrier partitioning assembly 520 that is positioned on a conveyer assembly (e.g., a carrier recirculation system) to direct a container carrier 510 to a loading position for one or more induction systems 425. In addition, or alternatively, a partitioning assembly 520 may include container partitioning assembly 520 that is positioned on a conveyer assembly (e.g., a container recirculation system 415) to direct an item container 505 to an ingress point for one or more induction systems 425. As described herein, a plurality of partitioning assemblies 520 may be strategically placed at one or more locations of a conveyer assembly to leverage a continuous movement of a plurality of item containers 505 and container carriers 510 for positioning the item containers 505 and container carriers 510 with respect to one or more induction systems 425 without stopping an operation of the conveyer assembly.

A partitioning assembly 520 may include one or more partitioning walls 515 (e.g., a partitioning wall 515-A, a partitioning wall 515-B, a partitioning wall 515-C). In some examples, a partitioning wall 515 may not be included in a partitioning assembly 520 and may be coupled with one or more other components of a fulfillment system. For example, the container recirculation system 415 may include one or more partitioning walls 515-D, which may be curved and may route item containers 505 from one conveyer to another conveyer. A partitioning wall 515-D may be an example of a device or a component of a fulfillment system that is used for routing or directing the movement of an object.

The partitioning wall 515-B may be configured to route one or more objects into an induction system. The partitioning wall 515-B may form one or more boundaries of a loading area (e.g., a container loading area, a carrier loading area). A location of the partitioning wall 515-B may be based on a diameter of a container carrier 510 or an item container 505. For example, a width of the loading area may be based on a diameter of a container carrier 510 or an item container 505. The partitioning wall 515-C may be configured to route one or more objects towards a partitioning assembly 520. For example, a first partitioning assembly 520 (e.g., for routing item containers 505 into the induction system 425-A) may route one or more item containers 505 away from a loading area of the first partitioning assembly 520 and towards a partitioning wall 515-C of the first partitioning assembly 520. The partitioning wall 515-C may then route the one or more item containers 505 towards a sidewall of the container recirculation system 415. The one or more item containers 505 may then contact the sidewall of the container recirculation system 415 and be conveyed towards a second partitioning assembly 520 (e.g., for routing item containers 505 into the induction system 425-B).

In some examples, a partitioning wall 515 may be static (e.g., a partitioning wall 515 may not move or have any moving parts). In some other examples, a partitioning wall 515 may be hinged and/or may deflect, rotate, or otherwise move upon being contacted by an object, such as a container carrier 510 and/or an item container 505. For example, the partitioning wall 515-A may be depressed by an item container 505 and may rotate about a hinge, allowing the item container 505 to move past the partitioning wall 515-A. The partitioning wall 515-B and the partitioning wall 515-C may be static or fixed. In some examples, the partitioning wall 515-A may not deflect if a loading area of the partitioning assembly 520 is full. For example, the partitioning wall 515-A may be in contact with an item container 505 inside of the loading area, which may prevent the partitioning wall 515-A from deflecting, and in turn, prevent additional item containers 505 from entering the loading area until one or more item containers 505 exit the loading area (e.g., are routed into an induction system 425).

A partitioning wall 515 may be an example of a type of routing device, such as a mechanical routing device, which may be different from some other types of routing devices (e.g., electronically controlled routing devices). A partitioning wall 515 may route or otherwise move an object, such as a container carrier 510 or an item container 505, from a first component of a fulfillment system (e.g., a recirculation system) to a second component of a fulfillment system (e.g., an induction system 425A-B). Additionally, or alternatively, a partitioning wall 515 may route an object along a conveyer. For example, a partitioning wall 515 may adjust or alter a path of an object as the object travels along a conveyer. In some examples, a partitioning wall 515 (e.g., the partitioning wall 515-D) may route an object from one conveyer to another conveyer (e.g., from a first portion of a conveyer assembly to a second portion of a conveyer assembly). In some examples, two or more partitioning walls 515 may be utilized (e.g., in conjunction with one another) to route an object. A carrier partitioning wall may be an example of a partitioning wall 515 utilized for moving or routing container carriers 510. A container partitioning wall may be an example of a partitioning wall 515 utilized for moving or routing item containers 505.

The continuous flow system 500 may include one or more recirculation systems. For example, the continuous flow system 500 may include a container recirculation system 415 for moving item containers 505 into the one or more induction systems 425A-B, a loading recirculation system 420 for moving container carriers 510 into the one or more loading positions with respect to the induction systems 425A-B, and/or one or more overflow recirculation systems 525 for moving container carriers 510 into and out of the loading recirculation system 420. In some examples, item containers 505 and container carrier 510 may be continuously moved into the one or more induction systems 425A-B (e.g., based on an availability of one or more item containers 505, based on an availability of one or more container carriers 510, or both). For example, an induction system 425A-B may be activated if at least one item container 505 and at least one container carrier 510 are detected at respective entry points of the induction system 425. In such examples, activating the induction system 425 may cause the induction system 425A-B to accept one or more item containers 505 and/or one or more container carrier 510.

In some other examples, an induction system 425A-B may operate continuously regardless of the availability or presence of item containers 505 and container carriers 510. In such examples, an item container 505 that is moved into an induction system 425 without a corresponding container carrier 510 being moved into the induction system 425 may be rerouted out of the induction system 425 and back into the container recirculation system 415. A container carrier 510 that is moved into the induction system 425A-B without a corresponding item container 505 being moved into the induction system 425 may be rerouted out of the induction system 425 and back into the loading recirculation system 420 (e.g., via the overflow recirculation system 525-A, via the overflow recirculation system 525-B, or both). In some examples, an induction system 425 or any other component of the continuous flow system 500 may include one or more sensors that may detect whether an item container 505 has been successfully loaded into a container carrier 510 (e.g., whether an error has occurred). Additionally, or alternatively, an induction system 425 or any other component of the continuous flow system 500 may include one or more sensors that may detect or otherwise determine container carrier availability (e.g., at an egress point of the induction system 425), container carrier availability (e.g., at an ingress point of the induction system 425), or both.

As described herein, a recirculation system may convey one or more item containers 505 or one or more container carriers 510 along a circular or looped path. Stated another way, a recirculation system may transport an object (e.g., an item container 505, a container carrier 510) from a starting point to one or more other points and back to the starting point. An object in a recirculation system may follow a circular path or an irregular, non-circular path based on a number of other objects in the recirculation system or based on whether the object collides with one or more other objects in the recirculation system. In some examples, one or more recirculation systems may, in conjunction with one another, convey one or more item containers 505 or one or more container carrier 510 along a circular or looped path. For example, the loading recirculation system 420 and the overflow recirculation systems 525A-B may (e.g., in conjunction) convey one or more container carriers 510 along a circular or looped path.

A recirculation system may include an entry point (e.g., a conveyer that moves objects into the recirculation system). An object's path in the recirculation system may be based on a location of the entry point. For example, the entry point of the container recirculation system 415, shown in FIG. 5, may move one or more item containers 505 onto a first surface (e.g., a first conveyer) of the container recirculation system 415. The first surface may transport the one or more item containers 505 in a first direction. The one or more item containers 505 may then collide with a partitioning wall 515-D (e.g., along an edge of the container recirculation system 415). The partitioning wall 515-D may move the one or more item containers 505 onto a second surface (e.g., a second conveyer), which may transport the one or more item containers 505 in a second direction opposite to and parallel to the first direction. Although FIG. 5 illustrates one example of an entry point initially moving the one or more item containers 505 onto the first surface, the container recirculation system 415 may have a different entry point in some other examples. For example, the container recirculation system 415 may have an entry point that moves the one or more item containers 505 onto the second surface and the one or more item containers 505 may be moved directly to an induction system 425 (e.g., without being transferred to the first surface).

In one illustrative example, an object may travel on the first surface in the first direction until the object is slides or is pushed (e.g., by another object or a partitioning wall 515) onto the second surface. The second surface may then convey the object in the second direction. In such examples, the object may be said to recirculate by way of switching from the first surface to the second surface (e.g., reversing direction, switching from a first conveyance direction to a second conveyance direction). In some examples, the object may recirculate or otherwise switch between surfaces continuously until the object is moved from the second surface and into an induction system 425A-B.

In some examples, a recirculation system may operate continuously. As a result, item containers 505 and container carriers 510 in respective recirculation systems may be conveyed continuously or may otherwise be continuously acted on by one or more forces of a continuously moving surface (e.g., conveyer) of a recirculation system. For example, a belt or a roller of a recirculation system may operate continuously even if one or more objects are stationary or temporarily stationary (e.g., the belt or roller may slip underneath the one or more objects without moving them). In such examples, the conveyer may continuously deliver objects (e.g., container carriers 510, item containers 505) to be moved out of the recirculation system.

Figure 6:
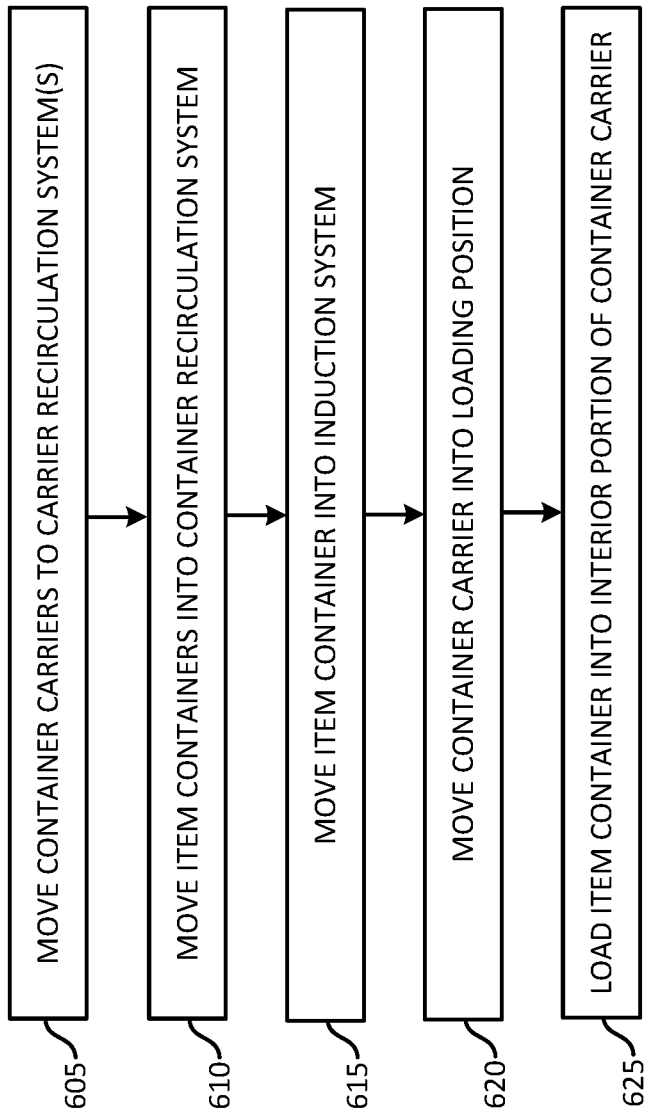
FIG. 6 is a flowchart showing an example of an automated object induction process in accordance with one or more embodiments of the present disclosure.

FIG. 6 is a flowchart showing an example of an automated object induction process 600 in accordance with some embodiments discussed herein. Although the example process 600 depicts a particular sequence of steps/operations, the sequence may be altered without departing from the scope of the present disclosure. For example, some of the steps/operations depicted may be performed in parallel or in a different sequence that does not materially impact the function of the process 600. In other examples, different components of an example device or system that implements the process 600 may perform functions at substantially the same time or in a specific sequence.

One or more operations of the process 600 may be implemented or caused by one or more components of a fulfillment system (e.g., a fulfillment system 400). The fulfillment system, as described herein, may be an example of a processing system, a delivery system, a manufacturing system, or any other type of system utilized for sorting, packaging, and delivering orders, such as pharmaceutical orders. In some examples, the operations described herein may be performed by a system described with reference to FIG. 5, such as a recirculation system, an induction system, a sensing system, or any other component of a fulfillment system.

In some embodiments, the process 600 includes, at step/operation 605, moving container carriers to one or more carrier recirculation systems. In some examples, step/operation 605 may include moving, using a first portion of a conveyer assembly, a plurality of container carriers to one or more carrier recirculation systems that are configured to recirculate the plurality of container carriers for one or more container carrier recirculation cycles.

In some examples, the one or more carrier recirculation systems may include an overflow recirculation system and a loading recirculation system. A container carrier may be moved to a loading position by the loading recirculation system.

In some embodiments, the process 600 includes, at step/operation 610, moving item containers to a container recirculation system. In some examples, step/operation 610 may include moving, using a second portion of the conveyer assembly, a plurality of item containers to a container recirculation system, positioned at least partially parallel to a carrier recirculation system of the one or more carrier recirculation systems, that is configured to recirculate the plurality of item containers for one or more item container recirculation cycles.

In some embodiments, the process 600 includes, at step/operation 615, moving an item container into an induction system. In some examples, step/operation 615 may include moving, using a container partitioning assembly of the container recirculation system, an item container of the plurality of item containers into an induction system. For example, the container partitioning assembly may include a plurality of container partitioning walls that define a container loading area for the induction system. The plurality of container partitioning walls may include (i) a first container partitioning wall that is at least partially parallel to a sidewall of the container recirculation system and (ii) one or more second container partitioning walls that are aligned to form one or more angles with the sidewall of the container recirculation system. In some examples, the container loading area may include the item container and a secondary item container of the plurality of item containers, and the item container may be moved from the container loading area into the induction system based on a force applied to the item container by the secondary item container. In some examples, a width dimension of the container loading area is based on a container diameter of the item container.

In some embodiments, the process 600 includes, at step/operation 620, moving a container carrier into a loading position. In some examples, step/operation 615 may include moving, using a carrier partitioning assembly of the one or more carrier recirculation systems, a container carrier of the plurality of container carriers to a loading position relative to the induction system. In some examples, the carrier partitioning assembly may include a plurality of carrier partitioning walls that define a carrier loading area for the induction system. The plurality of carrier partitioning walls may include (i) a first carrier partitioning wall that is at least partially parallel to a sidewall of the loading recirculation system and (ii) one or more second carrier partitioning walls that are aligned to form one or more angles with the sidewall of the loading recirculation system. In some examples, a carrier loading area may include the container carrier and a secondary container carrier of the plurality of container carriers. The container carrier may be moved to the loading position based on a force applied to the container carrier by the secondary container carrier.

In some examples, a width dimension of the carrier loading area is based on a container carrier diameter of the container carrier. For instance, a container carrier may include an exterior cylindrical portion that surrounds the interior portion of the container carrier and a diameter of the interior portion of the container carrier may be based on an item container diameter of the item container.

In some embodiments, the process 600 includes, at step/operation 625, loading the item container into an interior portion of the container carrier. In some examples, the process 600 may further include linking a container carrier identifier for the container carrier with an item container identifier for the item container. In some examples, the process 600 may include moving, using a third portion of the conveyer assembly, the container carrier and the item container to a sorting system based on the container carrier identifier. In some examples, the process 600 may include detecting a placement error associated with the loading of the item container into the interior portion of the container carrier. Additionally, or alternatively, the process 600 may include, in response to the placement error, moving the container carrier to the one or more carrier recirculation systems.

VI. CONCLUSION

Many modifications and other embodiments will come to mind to one skilled in the art to which this disclosure pertains having the benefit of the teachings presented in the foregoing descriptions and the associated drawings. Therefore, it is to be understood that the disclosure is not to be limited to the specific embodiments disclosed and that modifications and other embodiments are intended to be included within the scope of the appended claims. Although specific terms are employed herein, they are used in a generic and descriptive sense only and not for purposes of limitation.

VII. EXAMPLES

Example 1. A method, the method comprising: moving, using a first portion of a conveyer assembly, a plurality of container carriers to one or more carrier recirculation systems that are configured to recirculate the plurality of container carriers for one or more container carrier recirculation cycles; moving, using a second portion of the conveyer assembly, a plurality of item containers to a container recirculation system, positioned at least partially parallel to a carrier recirculation system of the one or more carrier recirculation systems, that is configured to recirculate the plurality of item containers for one or more item container recirculation cycles; moving, using a container partitioning assembly of the container recirculation system, an item container of the plurality of item containers into an induction system; moving, using a carrier partitioning assembly of the one or more carrier recirculation systems, a container carrier of the plurality of container carriers to a loading position relative to the induction system; and loading the item container into an interior portion of the container carrier.

Example 2. The method of example 1, wherein the container partitioning assembly comprises a plurality of container partitioning walls that define a container loading area for the induction system, the plurality of container partitioning walls comprising (i) a first container partitioning wall that is at least partially parallel to a sidewall of the container recirculation system and (ii) one or more second container partitioning walls that are aligned to form one or more angles with the sidewall of the container recirculation system.

Example 3. The method of example 2, wherein the container loading area comprises the item container and a secondary item container of the plurality of item containers and the item container is moved from the container loading area into the induction system based on a force applied to the item container by the secondary item container.

Example 4. The method of example 2, wherein a width dimension of the container loading area is based on a container diameter of the item container.

Example 5. The method of example 1, wherein the one or more carrier recirculation systems comprise an overflow recirculation system and a loading recirculation system, and the container carrier is moved to the loading position by the loading recirculation system.

Example 6. The method of example 5, wherein the carrier partitioning assembly comprises a plurality of carrier partitioning walls that define a carrier loading area for the induction system, the plurality of carrier partitioning walls comprising (i) a first carrier partitioning wall that is at least partially parallel to a sidewall of the loading recirculation system and (ii) one or more second carrier partitioning walls that are aligned to form one or more angles with the sidewall of the loading recirculation system.

Example 7. The method of example 6, wherein the carrier loading area comprises the container carrier and a secondary container carrier of the plurality of container carriers, and wherein the container carrier is moved to the loading position based on a force applied to the container carrier by the secondary container carrier.

Example 8. The method of example 6, wherein a width dimension of the carrier loading area is based on a container carrier diameter of the container carrier.

Example 9. The method of example 8, wherein the container carrier comprises an exterior cylindrical portion that surrounds the interior portion of the container carrier and a diameter of the interior portion of the container carrier is based on an item container diameter of the item container.

Example 10. The method of example 1, further comprising: linking a container carrier identifier for the container carrier with an item container identifier for the item container.

Example 11. The method of example 10, further comprising: moving, using a third portion of the conveyer assembly, the container carrier and the item container to a sorting system based on the container carrier identifier.

Example 12. The method of example 1, further comprising: detecting a placement error associated with the loading of the item container into the interior portion of the container carrier; and in response to the placement error, moving the container carrier to the one or more carrier recirculation systems.

Example 13. A system, the system comprising: a first portion of a conveyer assembly configured to move a plurality of container carriers to one or more carrier recirculation systems that are configured to recirculate the plurality of container carriers for one or more container carrier recirculation cycles; a second portion of the conveyer assembly configured to move a plurality of item containers to a container recirculation system that is configured to recirculate the plurality of item containers for one or more item container recirculation cycles; a container partitioning assembly disposed relative to the container recirculation system to direct a movement of an item container of the plurality of item containers to an induction system; a carrier partitioning assembly disposed relative to the one or more carrier recirculation systems to direct a movement of a container carrier of the plurality of container carriers to a loading position relative to the induction system; and the induction system configured to load the item container into an interior portion of the container carrier.

Example 14. The system of example 13, wherein the container partitioning assembly comprises a plurality of container partitioning walls that define a container loading area for the induction system, the plurality of container partitioning walls comprising (i) a first container partitioning wall that is at least partially parallel to a sidewall of the container recirculation system and (ii) one or more second container partitioning walls that are aligned to form one or more angles with the sidewall of the container recirculation system.

Example 15. The system of example 14, wherein the container loading area comprises the item container and a secondary item container of the plurality of item containers and the item container is moved from the container loading area into the induction system based on a force applied to the item container by the secondary item container.

Example 16. The system of example 14, wherein a width dimension of the container loading area is based on an item container diameter of the item container.

Example 17. The system of example 13, wherein the one or more carrier recirculation systems comprise an overflow recirculation system and a loading recirculation system and the container carrier is moved to the loading position by the loading recirculation system.

Example 18. The system of example 17, wherein the carrier partitioning assembly comprises a plurality of carrier partitioning walls that define a container carrier loading area for the induction system, the plurality of carrier partitioning walls comprising (i) a first carrier partitioning wall that is parallel to a sidewall of the loading recirculation system and (ii) one or more second carrier partitioning walls that are aligned to form one or more angles with the sidewall of the loading recirculation system.

Example 19. The system of example 18, wherein the container carrier loading area comprises the container carrier and a secondary container carrier of the plurality of container carriers and the container carrier is moved to the loading position based on a force applied to the container carrier by the secondary container carrier.

Example 20. A conveyer assembly, the conveyer assembly comprising: one or more carrier recirculation systems configured to recirculate a plurality of container carriers for one or more container carrier recirculation cycles; a container recirculation system positioned at least partially parallel to a carrier recirculation system and configured to recirculate a plurality of item containers for one or more item container recirculation cycles; a container partitioning assembly disposed relative to the container recirculation system to direct a movement of an item container of the plurality of item containers to an induction system; and a carrier partitioning assembly disposed relative to the one or more carrier recirculation systems to direct a movement of a container carrier of the plurality of container carriers to a loading position relative to the induction system.

The invention claimed is:

1. A method comprising:
    moving, using a first portion of a conveyer assembly, a plurality of container carriers to one or more carrier recirculation systems that are configured to recirculate the plurality of container carriers for one or more container carrier recirculation cycles;
    moving, using a second portion of the conveyer assembly, a plurality of item containers to a container recirculation system, positioned at least partially parallel to a carrier recirculation system of the one or more carrier recirculation systems, that is configured to recirculate the plurality of item containers for one or more item container recirculation cycles;
    moving, using a container partitioning assembly of the container recirculation system, an item container of the plurality of item containers into an induction system;
    moving, using a carrier partitioning assembly of the one or more carrier recirculation systems, a container carrier of the plurality of container carriers to a loading position relative to the induction system; and
    loading the item container into an interior portion of the container carrier.

2. The method of claim 1, wherein:
    (1) the container partitioning assembly comprises a plurality of container partitioning walls that define a container loading area for the induction system, and
    (2) the plurality of container partitioning walls comprise:
        (i) a first container partitioning wall that is positioned at least partially parallel to a sidewall of the container recirculation system, and
        (ii) one or more second container partitioning walls that are aligned to form one or more angles with the sidewall of the container recirculation system.

3. The method of claim 2, wherein the container loading area comprises the item container and a secondary item container of the plurality of item containers and the item container is moved from the container loading area into the induction system based on a force applied to the item container by the secondary item container.

4. The method of claim 2, wherein a width dimension of the container loading area is based on a container diameter of the item container.

5. The method of claim 1, wherein the one or more carrier recirculation systems comprise an overflow recirculation system and a loading recirculation system, and the container carrier is moved to the loading position by the loading recirculation system.

6. The method of claim 5, wherein:
(1) the carrier partitioning assembly comprises a plurality of carrier partitioning walls that define a carrier loading area for the induction system, and
(2) the plurality of carrier partitioning walls comprise:
(i) a first carrier partitioning wall that is positioned at least partially parallel to a sidewall of the loading recirculation system, and
(ii) one or more second carrier partitioning walls that are aligned to form one or more angles with the sidewall of the loading recirculation system.

7. The method of claim 6, wherein the carrier loading area comprises the container carrier and a secondary container carrier of the plurality of container carriers, and wherein the container carrier is moved to the loading position based on a force applied to the container carrier by the secondary container carrier.

8. The method of claim 6, wherein a width dimension of the carrier loading area is based on a container carrier diameter of the container carrier.

9. The method of claim 8, wherein the container carrier comprises an exterior cylindrical portion that surrounds the interior portion of the container carrier and a diameter of the interior portion of the container carrier is based on an item container diameter of the item container.

10. The method of claim 1, further comprising:
linking a container carrier identifier for the container carrier with an item container identifier for the item container.

11. The method of claim 10, further comprising:
moving, using a third portion of the conveyer assembly, the container carrier and the item container to a sorting system based on the container carrier identifier.

12. The method of claim 1, further comprising:
detecting a placement error associated with a placement of the item container into the interior portion of the container carrier; and
in response to the placement error, moving the container carrier to the one or more carrier recirculation systems.

13. A system comprising:
a first portion of a conveyer assembly configured to move a plurality of container carriers to one or more carrier recirculation systems that are configured to recirculate the plurality of container carriers for one or more container carrier recirculation cycles;
a second portion of the conveyer assembly configured to move a plurality of item containers to a container recirculation system that is configured to recirculate the plurality of item containers for one or more item container recirculation cycles;
a container partitioning assembly disposed relative to the container recirculation system to direct a movement of an item container of the plurality of item containers to an induction system;
a carrier partitioning assembly disposed relative to the one or more carrier recirculation systems to direct a movement of a container carrier of the plurality of container carriers to a loading position relative to the induction system; and
the induction system configured to load the item container into an interior portion of the container carrier.

14. The system of claim 13, wherein:
(1) the container partitioning assembly comprises a plurality of container partitioning walls that define a container loading area for the induction system, and
(2) the plurality of container partitioning walls comprise:
(i) a first container partitioning wall that is positioned at least partially parallel to a sidewall of the container recirculation system, and
(ii) one or more second container partitioning walls that are aligned to form one or more angles with the sidewall of the container recirculation system.

15. The system of claim 14, wherein the container loading area comprises the item container and a secondary item container of the plurality of item containers and the item container is moved from the container loading area into the induction system based on a force applied to the item container by the secondary item container.

16. The system of claim 14, wherein a width dimension of the container loading area is based on an item container diameter of the item container.

17. The system of claim 13, wherein the one or more carrier recirculation systems comprise an overflow recirculation system and a loading recirculation system, and the container carrier is moved to the loading position by the loading recirculation system.

18. The system of claim 17, wherein:
(1) the carrier partitioning assembly comprises a plurality of carrier partitioning walls that define a carrier loading area for the induction system, and
(2) the plurality of carrier partitioning walls comprise
(i) a first carrier partitioning wall that is positioned at least partially parallel to a sidewall of the loading recirculation system, and
(ii) one or more second carrier partitioning walls that are aligned to form one or more angles with the sidewall of the loading recirculation system.

19. The system of claim 18, wherein the carrier loading area comprises the container carrier and a secondary container carrier of the plurality of container carriers, and the container carrier is moved to the loading position based on a force applied to the container carrier by the secondary container carrier.

20. A conveyer assembly comprising:
one or more carrier recirculation systems configured to recirculate a plurality of container carriers for one or more container carrier recirculation cycles;
a container recirculation system positioned at least partially parallel to a carrier recirculation system and configured to recirculate a plurality of item containers for one or more item container recirculation cycles;
a container partitioning assembly disposed relative to the container recirculation system to direct a movement of an item container of the plurality of item containers to an induction system; and
a carrier partitioning assembly disposed relative to the one or more carrier recirculation systems to direct a movement of a container carrier of the plurality of container carriers to a loading position relative to the induction system.

* * * * *